US011548731B2

(12) United States Patent
Austrheim et al.

(10) Patent No.: US 11,548,731 B2
(45) Date of Patent: Jan. 10, 2023

(54) DISPLACEMENT MECHANISM FOR A REMOTELY OPERATED VEHICLE

(71) Applicant: Autostore Technology AS, Nedre Vats (NO)

(72) Inventors: Trond Austrheim, Etne (NO); Jørgen Djuve Heggebø, Olen (NO); Ivar Fjeldheim, Haugesund (NO); Børge Bekken, Haugesund (NO)

(73) Assignee: Autostore Technology AS, Nedre Vats (NO)

( * ) Notice: Subject to any disclaimer, the term of this patent is extended or adjusted under 35 U.S.C. 154(b) by 0 days.

(21) Appl. No.: 17/806,912

(22) Filed: Jun. 14, 2022

(65) Prior Publication Data

US 2022/0306384 A1    Sep. 29, 2022

Related U.S. Application Data

(63) Continuation of application No. 16/957,116, filed as application No. PCT/EP2019/050215 on Jan. 7, 2019, now Pat. No. 11,479,407.

(30) Foreign Application Priority Data

Jan. 9, 2018   (NO) .................................... 20180031
Mar. 5, 2018   (WO) ................. PCT/EP2018/055275
(Continued)

(51) Int. Cl.
*B65G 1/04*        (2006.01)
*B65G 1/06*        (2006.01)
(Continued)

(52) U.S. Cl.
CPC ......... *B65G 1/0464* (2013.01); *B65G 1/0492* (2013.01); *B65G 1/065* (2013.01);
(Continued)

(58) Field of Classification Search
CPC .... B65G 1/0464; B65G 1/0492; B65G 1/065; B65G 1/1378; B65G 2201/0235;
(Continued)

(56) References Cited

U.S. PATENT DOCUMENTS 1,953,132 A    4/1934  Renken
3,051,321 A    8/1962  Ramsden
(Continued)

FOREIGN PATENT DOCUMENTS

CA    2988122 A1    12/2016
CN    101553416 A   10/2009
(Continued)

OTHER PUBLICATIONS

Office Action issued in counterpart Chinese Application No. 201980039066.2 dated Sep. 10, 2021 (10 pages).
(Continued)

*Primary Examiner* — Saul Rodriguez
*Assistant Examiner* — Ashley K Romano
(74) *Attorney, Agent, or Firm* — Osha Bergman Watanabe & Burton LLP

(57) ABSTRACT

A displacement mechanism for a remotely operated vehicle includes a motor configured to actuate a drive crank, a coupler link connected to the drive crank on a first side, and a lift rocker on a second side, a displacement link connected to the lift rocker, and a displacement plate connected to the displacement link and having a plurality of wheels provided thereon. The drive crank, the coupler link, the lift rocker, the displacement link, and the displacement plate are each respectively connected with pivot connections such that actuation of the motor actuates the displacement plate between a raised position and a lowered position. The lift rocker is configured with a pivot point arranged in a body of the lift rocker such that the lift rocker, the pivot connection
(Continued)

between the displacement link and the lift rocker, and the pivot connection between the lift rocker and the coupler link each rotate around the pivot point when the motor is actuated.

20 Claims, 11 Drawing Sheets

(30) Foreign Application Priority Data

| Apr. 25, 2018 | (NO) | 20180586 |
|---|---|---|
| Apr. 25, 2018 | (NO) | 20180587 |
| Apr. 25, 2018 | (NO) | 20180588 |
| Apr. 25, 2018 | (NO) | 20180589 |
| Apr. 25, 2018 | (NO) | 20180591 |
| Apr. 28, 2018 | (NO) | 20180590 |
| Jun. 12, 2018 | (NO) | 20180813 |
| Jul. 19, 2018 | (NO) | 20181005 |
| Aug. 21, 2018 | (NO) | 20181098 |
| Oct. 12, 2018 | (NO) | 20181319 |

(51) Int. Cl.
F16H 21/14 (2006.01)
B65G 1/137 (2006.01)

(52) U.S. Cl.
CPC .... *B65G 1/1378* (2013.01); *B65G 2201/0235* (2013.01); *F16H 21/14* (2013.01)

(58) Field of Classification Search
CPC .. F16H 21/14; B61B 5/00; B61B 5/02; B61B 10/00; B61B 10/001
See application file for complete search history.

(56) References Cited

U.S. PATENT DOCUMENTS

| 3,334,522 | A |  | 8/1967 | Foffin | |
|---|---|---|---|---|---|
| 3,519,150 | A |  | 7/1970 | Keena et al. | |
| 3,626,857 | A | * | 12/1971 | Omar | B61F 9/00 |
|  |  |  |  |  | 246/433 |
| 3,650,216 | A |  | 3/1972 | Harwick et al. | |
| 3,673,967 | A | * | 7/1972 | Kropf | B61B 5/02 |
|  |  |  |  |  | 246/25 |
| 3,774,548 | A |  | 11/1973 | Borst | |
| 3,789,998 | A |  | 2/1974 | Fathauer et al. | |
| 3,800,963 | A |  | 4/1974 | Holland | |
| 3,978,995 | A |  | 9/1976 | Zollinger et al. | |
| 4,056,063 | A | * | 11/1977 | Ritter | B61B 10/00 |
|  |  |  |  |  | 198/352 |
| 4,522,128 | A | * | 6/1985 | Anderson | E01B 25/28 |
|  |  |  |  |  | 104/130.07 |
| 4,538,950 | A |  | 9/1985 | Shiomi et al. | |
| 4,909,697 | A |  | 3/1990 | Bernard, II et al. | |
| 5,280,880 | A |  | 1/1994 | Ewing et al. | |
| 7,101,139 | B1 |  | 9/2006 | Benedict | |
| 9,527,669 | B1 |  | 12/2016 | Hanssen et al. | |
| 2004/0101393 | A1 |  | 5/2004 | Lopez Alba | |
| 2005/0047895 | A1 |  | 3/2005 | Lert | |
| 2005/0118003 | A1 |  | 6/2005 | Mitchell et al. | |
| 2006/0056951 | A1 | * | 3/2006 | Williamson | B66F 9/07 |
|  |  |  |  |  | 414/626 |
| 2008/0147306 | A1 |  | 6/2008 | Hayashi | |
| 2011/0027059 | A1 |  | 2/2011 | Benedict et al. | |
| 2012/0282068 | A1 |  | 11/2012 | Tschurwald et al. | |
| 2013/0103552 | A1 |  | 4/2013 | Hoffman et al. | |
| 2013/0302132 | A1 |  | 11/2013 | D'Andrea | |
| 2014/0014470 | A1 |  | 1/2014 | Razumov | |
| 2014/0086714 | A1 |  | 3/2014 | Malik | |
| 2014/0217977 | A1 |  | 8/2014 | Pastoor et al. | |
| 2014/0277693 | A1 |  | 9/2014 | Naylor | |
| 2014/0288696 | A1 |  | 9/2014 | Lert | |
| 2015/0375667 | A1 | * | 12/2015 | Ledford | B61B 5/02 |
|  |  |  |  |  | 410/67 |
| 2016/0060033 | A1 |  | 3/2016 | Izumi | |
| 2016/0060037 | A1 |  | 3/2016 | Razumov | |
| 2016/0176638 | A1 |  | 6/2016 | Toebes | |
| 2016/0194151 | A1 |  | 7/2016 | Lindbo et al. | |
| 2016/0229630 | A1 |  | 8/2016 | Gebhardt et al. | |
| 2016/0236916 | A1 |  | 8/2016 | Hall et al. | |
| 2016/0325932 | A1 |  | 11/2016 | Hognaland | |
| 2016/0340122 | A1 |  | 11/2016 | Lindblom | |
| 2016/0355337 | A1 |  | 12/2016 | Lert et al. | |
| 2017/0057745 | A1 |  | 3/2017 | Ueda et al. | |
| 2017/0129702 | A1 |  | 5/2017 | Hognaland | |
| 2017/0152111 | A1 |  | 6/2017 | Kinugawa et al. | |
| 2017/0166400 | A1 |  | 6/2017 | Hofmann | |
| 2017/0183156 | A1 |  | 6/2017 | Yoshioka et al. | |
| 2017/0305668 | A1 |  | 10/2017 | Bestic et al. | |
| 2018/0029798 | A1 |  | 2/2018 | Lindbo et al. | |
| 2018/0068253 | A1 |  | 3/2018 | Simms et al. | |
| 2018/0072546 | A1 |  | 3/2018 | Hognaland | |
| 2018/0082162 | A1 |  | 3/2018 | Durham et al. | |
| 2018/0118078 | A1 |  | 5/2018 | Alkhaldi et al. | |
| 2018/0141754 | A1 |  | 5/2018 | Garrett et al. | |
| 2018/0150793 | A1 |  | 5/2018 | Lert, Jr. et al. | |
| 2019/0062051 | A1 |  | 2/2019 | Warhurst | |
| 2019/0189488 | A1 |  | 6/2019 | Ito | |
| 2019/0331039 | A1 |  | 10/2019 | Shelby et al. | |
| 2019/0331048 | A1 |  | 10/2019 | Ulrey et al. | |
| 2020/0122936 | A1 | * | 4/2020 | Bennett | B65B 35/54 |
| 2020/0385209 | A1 |  | 12/2020 | Garcia et al. | |
| 2021/0072754 | A1 | * | 3/2021 | Senske | B60P 3/00 |
| 2021/0188546 | A1 |  | 6/2021 | Becker et al. | |

FOREIGN PATENT DOCUMENTS

| CN | 101711210 A | 5/2010 |
|---|---|---|
| CN | 102050333 A | 5/2011 |
| CN | 102992012 A | 3/2013 |
| CN | 103101737 A | 5/2013 |
| CN | 104781163 A | 7/2015 |
| CN | 104828450 A | 8/2015 |
| CN | 104885106 A | 9/2015 |
| CN | 204606833 U | 9/2015 |
| CN | 105383848 A | 3/2016 |
| CN | 105517923 A | 4/2016 |
| CN | 105947514 A | 9/2016 |
| CN | 106064718 A | 11/2016 |
| CN | 106241154 A | 12/2016 |
| CN | 205819367 U | 12/2016 |
| CN | 106414278 A | 2/2017 |
| CN | 106575391 A | 4/2017 |
| CN | 106660703 A | 5/2017 |
| CN | 106829298 A | 6/2017 |
| CN | 206419874 U | 8/2017 |
| CN | 206790852 U | 12/2017 |
| CN | 108140168 A | 6/2018 |
| DE | 3741192 A1 | 6/1989 |
| DE | 4016810 C1 | 11/1991 |
| DE | 9310690 U1 | 9/1993 |
| DE | 102009017241 A1 | 10/2010 |
| DE | 102012110581 A1 | 5/2014 |
| DE | 102013009340 A1 | 12/2014 |
| EP | 0133472 A2 | 2/1985 |
| EP | 0458021 A1 | 11/1991 |
| EP | 0698530 A1 | 2/1996 |
| EP | 1359101 A2 | 11/2003 |
| EP | 2466252 A1 | 6/2012 |
| EP | 2743227 A1 | 6/2014 |
| EP | 2881905 A1 | 6/2015 |
| EP | 3003932 A1 | 4/2016 |
| EP | 3053855 A2 | 8/2016 |
| EP | 3257790 A1 | 12/2017 |
| GB | 379669 A | 8/1932 |
| GB | 1 267 751 A | 3/1972 |
| GB | 1276160 A | 6/1972 |
| GB | 2211822 A | 7/1989 |
| GB | 2544650 A | 5/2017 |
| GB | 2550027 A | 11/2017 |
| JP | S6417707 A | 1/1989 |

(56) References Cited

FOREIGN PATENT DOCUMENTS

| | | |
|---|---|---|
| JP | S64-24090 U | 2/1989 |
| JP | H02-11455 A | 1/1990 |
| JP | H04-123969 A | 4/1992 |
| JP | H08-38268 A | 2/1996 |
| JP | H1081487 A | 3/1998 |
| JP | H11106181 A | 4/1999 |
| JP | 2000044010 A | 2/2000 |
| JP | 2001192103 A | 7/2001 |
| JP | 2003/118671 A | 4/2003 |
| JP | 2015208837 A | 11/2015 |
| JP | 2017088404 A | 5/2017 |
| KR | 20060064298 A | 6/2006 |
| KR | 101011371 B1 | 1/2011 |
| KR | 20170026074 A | 3/2017 |
| NO | 317366 B1 | 10/2004 |
| RU | 2008111257 A | 10/2009 |
| WO | 9614258 A1 | 5/1996 |
| WO | 2005/077788 A1 | 8/2005 |
| WO | 2005077789 A1 | 8/2005 |
| WO | 2007/149711 A2 | 12/2007 |
| WO | 2012/106746 A1 | 8/2012 |
| WO | 2014/075937 A1 | 5/2014 |
| WO | 2014086714 A1 | 6/2014 |
| WO | 2014090684 A1 | 6/2014 |
| WO | 2014/195901 A1 | 12/2014 |
| WO | 2014/203126 A1 | 12/2014 |
| WO | 2015019055 A1 | 2/2015 |
| WO | 2015/084236 A1 | 6/2015 |
| WO | 2015/115965 A1 | 8/2015 |
| WO | 2015140216 A1 | 9/2015 |
| WO | 2015/185628 A2 | 12/2015 |
| WO | 2015/197709 A1 | 12/2015 |
| WO | 2015193278 A1 | 12/2015 |
| WO | 2016/172253 A1 | 10/2016 |
| WO | 2016166294 A1 | 10/2016 |
| WO | 2016166323 A1 | 10/2016 |
| WO | 2016172793 A1 | 11/2016 |
| WO | 2016/196815 A1 | 12/2016 |
| WO | 2016198467 A1 | 12/2016 |
| WO | 2017/037095 A1 | 3/2017 |
| WO | 2017081275 A1 | 5/2017 |
| WO | 2017081281 A1 | 5/2017 |
| WO | 2017/121512 A1 | 7/2017 |
| WO | 2017/129384 A1 | 8/2017 |
| WO | 2017/144054 A1 | 8/2017 |
| WO | 2017/148963 A1 | 9/2017 |
| WO | 2017/153583 A1 | 9/2017 |
| WO | 2017153563 A1 | 9/2017 |
| WO | 2017211640 A1 | 12/2017 |
| WO | 2017220627 A1 | 12/2017 |
| WO | 2017220651 A1 | 12/2017 |
| WO | 2018/060527 A1 | 4/2018 |
| WO | 2018/073392 A1 | 4/2018 |
| WO | 2018162757 A1 | 9/2018 |
| WO | 2018/210851 A1 | 11/2018 |
| WO | 2018/210923 A1 | 11/2018 |

OTHER PUBLICATIONS

Search Report issued in counterpart Chinese Application No. 201980039066.2 dated Sep. 6, 2021 (3 pages).
Office Action issued in Chinese Application No. 201980037162.3; dated Sep. 27, 2021 (8 pages).
Extended European Search Report issued in European Application No. 21186410.3, dated Nov. 25, 2021 (5 pages).
Office Action issued in the counterpart Chinese Patent Application No. 201980037723X, dated Sep. 17, 2021 (25 pages).
Office Action issued in the counterpart Chinese Patent Application No. 2019800383353, dated Dec. 17, 2021 (3 pages).
Office Action in counterpart Chinese Patent Application No. 201980038106.1 dated Sep. 8, 2021 (6 pages).
Office Action in counterpart Chinese Patent Application No. 201980039028.7 dated Oct. 27, 2021 (15 pages).
Office Action in counterpart Chinese Patent Application No. 201980039046.5 dated Sep. 15, 2021 (18 pages).
Office Action in counterpart Chinese Patent Application No. 201980039068.1 dated Sep. 15, 2021 (23 pages).
Office Action in counterpart Chinese Patent Application No. 201980038856.9 dated Oct. 19, 2021 (16 pages).
Office Action in counterpart Chinese Patent Application No. 2019800538763 dated Dec. 6, 2021 (13 pages).
Office Action in counterpart Chinese Patent Application No. 2019800393798 dated Dec. 9, 2021 (17 pages).

\* cited by examiner

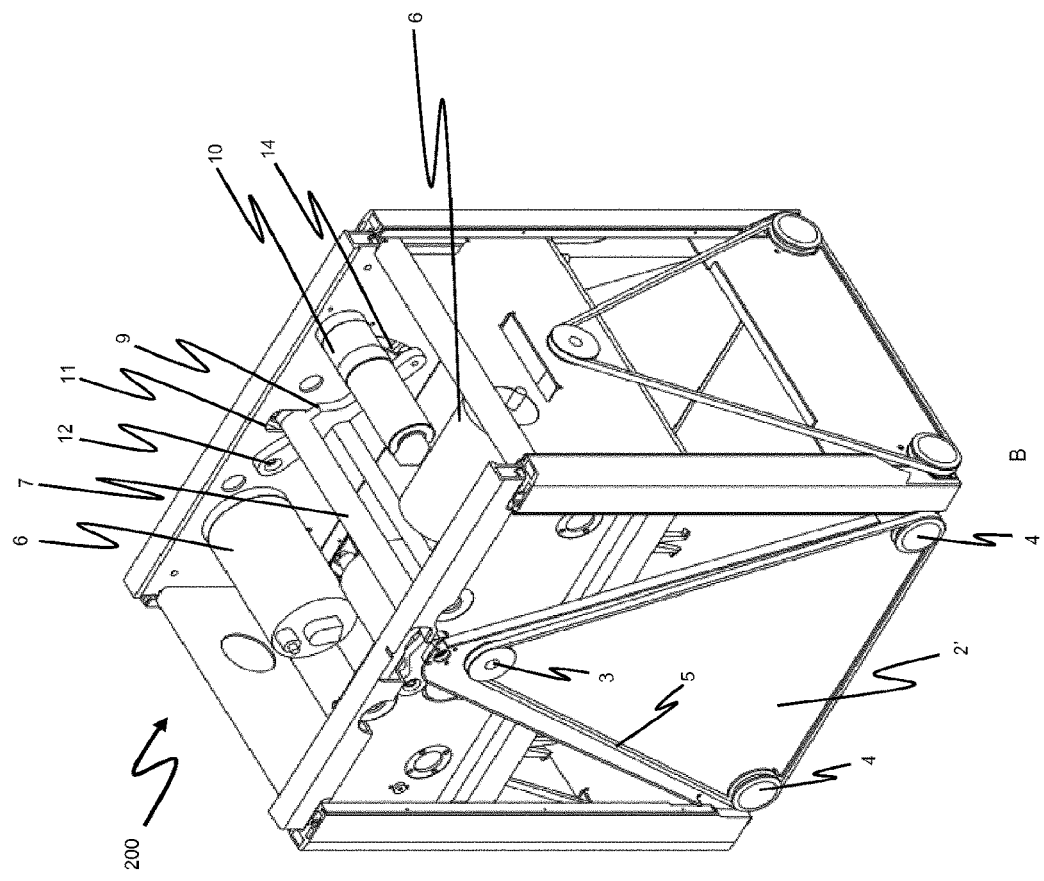
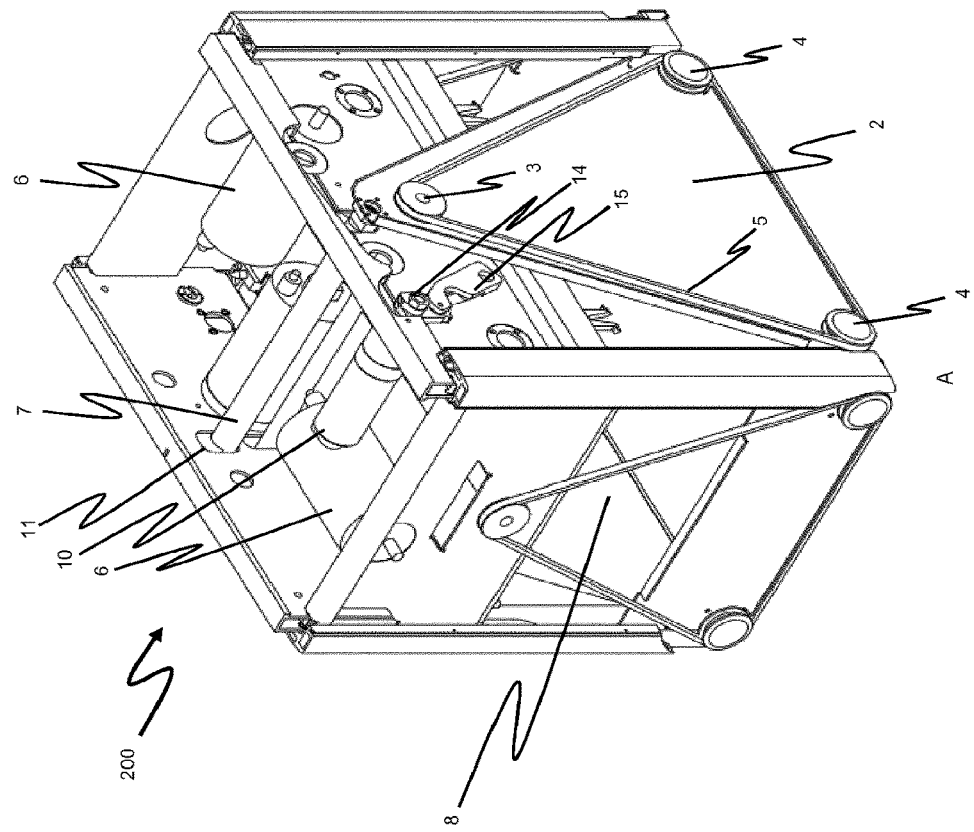
Fig. 3 (Prior Art)

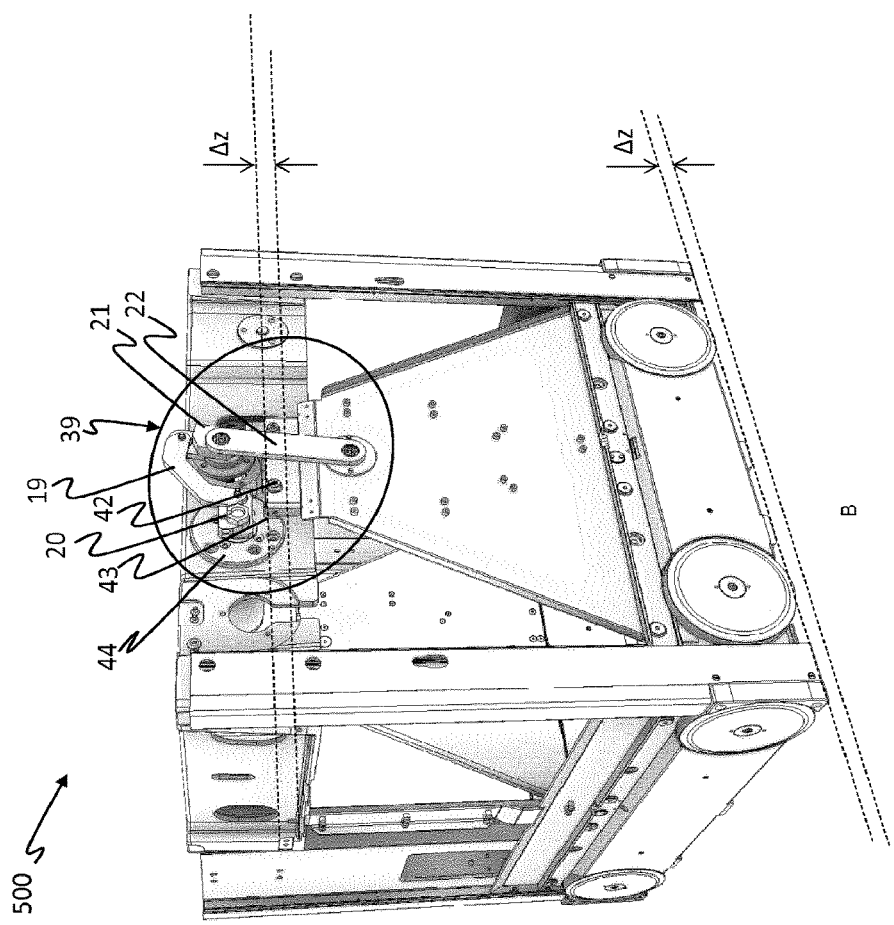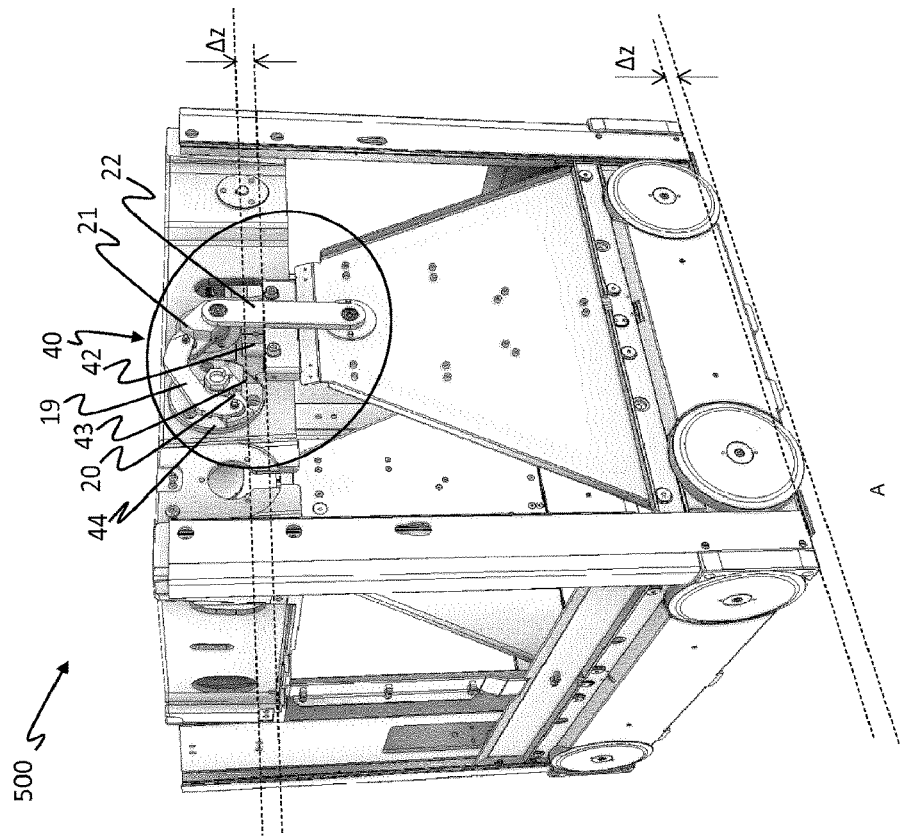
Fig. 7

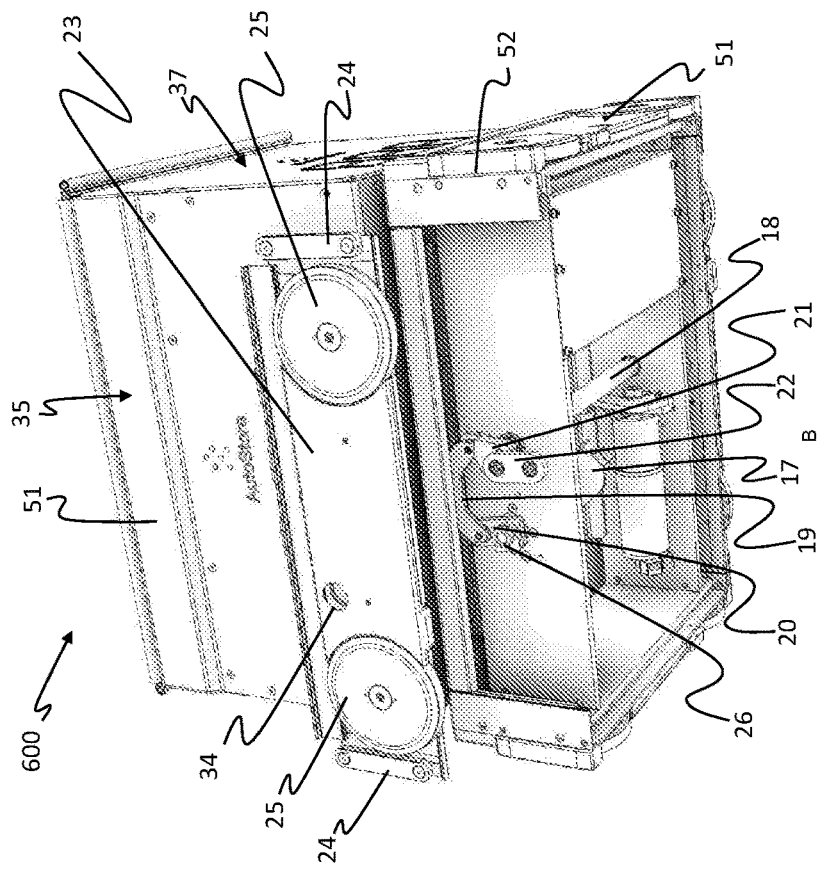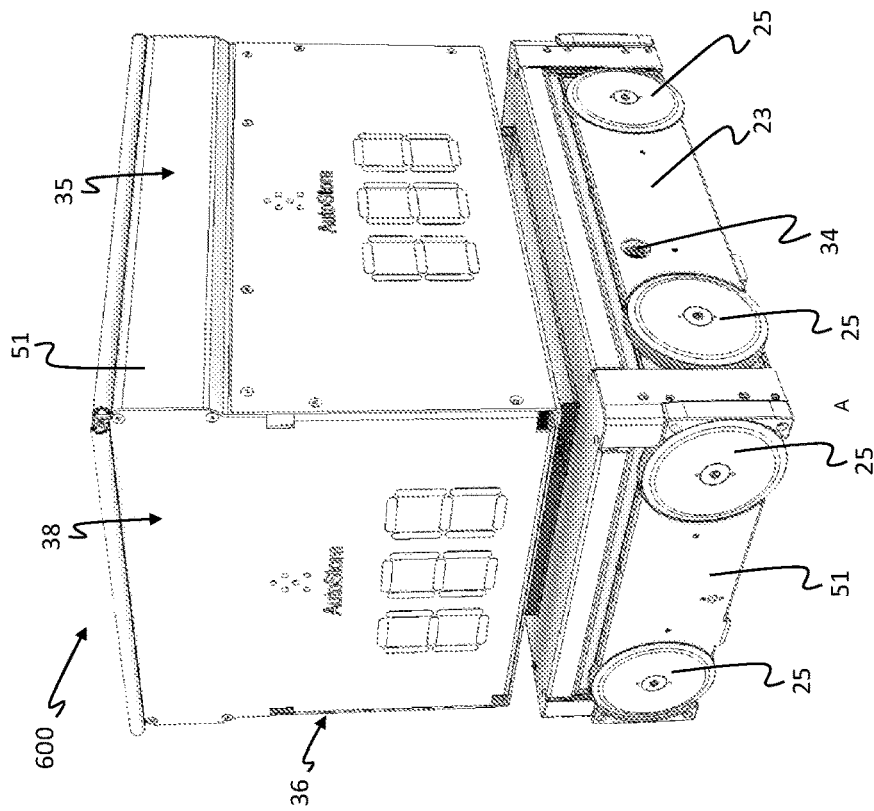
Fig. 9

DISPLACEMENT MECHANISM FOR A REMOTELY OPERATED VEHICLE

TECHNICAL FIELD

The present invention relates to a displacement mechanism for a remotely operated vehicle, the displacement mechanism being for raising and lowering wheels onto a rail system that the remotely operated vehicle runs on.

BACKGROUND AND PRIOR ART

FIGS. 1A and 1C disclose a typical prior art automated storage and retrieval system 1 with a framework structure 100. FIGS. 1B and 1D disclose a prior art container handling vehicle 200,300 operating the system 1 disclosed in FIGS. 1A and 1C, respectively.

The framework structure 100 comprises a plurality of upright members 102 and optionally a plurality of horizontal members 103 supporting the upright members 102. The members 102, 103 may typically be made of metal, e.g. extruded aluminum profiles.

The framework structure 100 defines a storage grid 104 comprising storage columns 105 arranged in rows, in which storage columns 105 storage containers 106, also known as bins, are stacked one on top of another to form stacks 107.

Each storage container 106 may typically hold a plurality of product items (not shown), and the product items within a storage container 106 may be identical, or may be of different product types depending on the application.

The storage grid 104 guards against horizontal movement of the storage containers 106 in the stacks 107, and guides vertical movement of the storage containers 106, but does normally not otherwise support the storage containers 106 when stacked.

The automated storage and retrieval system 1 comprises a container handling vehicle rail system 108 arranged in a grid pattern across the top of the storage 104, on which rail system 108 a plurality of container handling vehicles 200, 300 (as exemplified in FIGS. 1B and 1D) are operated to raise storage containers 106 from, and lower storage containers 106 into, the storage columns 105, and also to transport the storage containers 106 above the storage columns 105. The horizontal extent of one of the grid cells 122 constituting the grid pattern is in FIGS. 1A and 1C marked by thick lines.

Each grid cell 122 has a width which is typically within the interval of 30 to 150 cm, and a length which is typically within the interval of 50 to 200 cm. Each grid opening 115 has a width and a length which is typically 2 to 10 cm less than the width and the length of the grid cell 122 due to the horizontal extent of the rails 1 10,111.

The rail system 108 comprises a first set of parallel rails 110 arranged to guide movement of the container handling vehicles 200,300 in a first direction X across the top of the frame structure 100, and a second set of parallel rails 11 1 arranged perpendicular to the first set of rails 1 10 to guide movement of the container handling vehicles 200,300 in a second direction Y which is perpendicular to the first direction X. In this way, the rail system 108 defines grid columns above which the container handling vehicles 200,300 can move laterally above the storage columns 105, i.e. in a plane which is parallel to the horizontal X-Y plane.

Each prior art container handling vehicle 200,300 comprises a vehicle body and a wheel arrangement of eight wheels 201,301 where a first set of four wheels enable the lateral movement of the container handling vehicles 200,300 in the X direction and a second set of the remaining four wheels enable the lateral movement in the Y direction. One or both sets of wheels in the wheel arrangement can be lifted and lowered, so that the first set of wheels and/or the second set of wheels can be engaged with the respective set of rails 110, 111 at any one time.

Each prior art container handling vehicle 200,300 also comprises a lifting device (not shown) for vertical transportation of storage containers 106, e.g. raising a storage container 106 from, and lowering a storage container 106 into, a storage column 105. The lifting device comprises one or more gripping/engaging devices (not shown) which are adapted to engage a storage container 106, and which gripping/engaging devices can be lowered from the vehicle 201,301 so that the position of the gripping/engaging devices with respect to the vehicle 201,301 can be adjusted in a third direction Z which is orthogonal the first direction X and the second direction Y.

Conventionally, and also for the purpose of this application, Z=1 identifies the uppermost layer of the grid 104, i.e. the layer immediately below the rail system 108, Z=2 the second layer below the rail system 108, Z=3 the third layer etc. In the exemplary prior art grid 104 disclosed in FIGS. 1A and 1C, Z=8 identifies the lowermost, bottom layer of the grid 104. Consequently, as an example, and using the Cartesian coordinate system X, Y, Z indicated in FIGS. 1A and 1D, the storage container identified as 106' in FIG. 1A can be said to occupy grid location or cell X=10, Y=2, Z=3. The container handling vehicles 200,300 can be said to travel in layer Z=0 and each grid column can be identified by its X and Y coordinates.

Each first container handling vehicle 200 comprises a storage compartment or space 8 for receiving and stowing a storage container 106 when transporting the storage container 106 across the rail system 108. The storage space may comprise a cavity arranged centrally within the vehicle body, e.g. as is described in WO2014/090684A1, the contents of which are incorporated herein by reference.

Alternatively, the second container handling vehicles 300 may have a cantilever construction, as is described in N0317366, the contents of which are also incorporated herein by reference.

The first container handling vehicles 200 may have a footprint, i.e. an extent in the X and Y directions, which is generally equal to the lateral extent of a grid cell 122, i.e. the extent of a grid cell 122 in the X and Y directions, e.g. as is described in WO2015/193278A1, the contents of which are incorporated herein by reference. The term "lateral" used herein may mean "horizontal".

Alternatively, the first container handling vehicles 200 may have a footprint which is larger than the lateral extent of (lateral area defined by) a grid column 105, e.g. as is disclosed in WO2014/090684A1.

FIG. 3 illustrates a prior art first container handling vehicle 200 stripped of outer panels to expose a displacement mechanism capable of lowering and lifting one of the sets of wheels in the wheel arrangement 201. The second container handling vehicle 300 may also comprise a similar displacement mechanism to that of FIG. 3. However, the configuration and placement of said displacement mechanism in the second container handling vehicle 300 may deviate from that of FIG. 3, as the cantilever construction allows for other configurations of the displacement mechanism in the vehicle body of the container handling vehicle 300.

The displacement mechanism illustrated in FIG. 3 is fully described in WO2015/193278A1, but a summary is included herein for the sake of clarity.

As seen in FIG. 3, the displacement mechanism comprises a first and second displacement plate 2,2' positioned along opposing side walls of the vehicle's 200 framework. Provided on each of the displacement plates 2,2' is a master wheel 3 and two slaves wheels 4 which are connected by an encircling band 5. The slave wheels 4 comprise one set of wheels of the wheel arrangement 201, and are rotated by the encircling band 5 which is driven by the master wheel 3 connected to one or more drive units 6.

The displacement plates 2,2' are interconnected by a vertically displaceable bar 7 mounted above the container receiving space 8, and displacement of the bar 7 thus results in simultaneous displacement of the displacement plates 2,2' and the wheels 3,4 provided on said plates 2,2'. The displacement of the bar 7 is achieved by means of a lever arm 9 configured to exert a force activated by a displacement motor 20, thereby moving the bar 7 vertically. The bar 7 is arranged and guided within guiding slots 1 1 having a width being slightly larger than the diameter of the bar 7 and a length being equal or slightly longer than the total displacement length. The end of the lever arm 9 is mounted on a rotatable bolt 12 situated at one lateral side of the bar, thus defining a fulcrum 12.

The displacement motor 10 functions as the rotational mechanism of the lever arm 9, and is situated at the opposite lateral side of the bar 7 relative to the fulcrum 12. The displacement motor 10 is thus connected to a lever arm wheel 14, and a locking arm 15 is arranged at one end to the lever arm wheel 14 and attached in the other end to the end of the lever arm 9 opposite to the fulcrum 12. The locking arm 15 is configured to at least partly enclose the lever arm wheel 14 when the lever arm 9 is rotated into its raised position, i.e. a position where the bar 7 has been pushed up to its uppermost position; thereby blocking any vertical movements of the lever arm 9 that is not caused by controlled operation of the displacement motor 10.

The rail system 108 may be a single track system, as is shown in FIG. 2A. Alternatively, the rail system 108 may be a double track system, as is shown in FIG. 2B, thus allowing a container handling vehicle 201 having a footprint 202,202' generally corresponding to the lateral area defined by a grid column 112 to travel along a row of grid columns even if another container handling vehicle 200 is positioned above a grid column neighboring that row. Both the single and double track system, or a combination comprising a single and double track arrangement in a single rail system 108, forms a grid pattern in the horizontal plane P comprising a plurality of rectangular and uniform grid locations or grid cells 122, where each grid cell 122 comprises a grid opening 115 being delimited by a pair of rails 1 10a, 110b of the first rails 110 and a pair of rails 11 1a,111b of the second set of rails 11 1. In FIG. 2B the grid cell 122 is indicated by a dashed box.

Consequently, rails 110a and 110b form pairs of neighboring rails defining parallel rows of grid cells running in the X direction, and rails 11 1a and 11 1b form pairs of neighboring rails defining parallel rows of grid cells running in the Y direction.

As shown in FIG. 2C, each grid cell 122 has a width $W_c$ which is typically within the interval of 30 to 150 cm, and a length $L_c$ which is typically within the interval of 50 to 200 cm. Each grid opening 115 has a width Wo and a length Lo which is typically 2 to 10 cm less than the width $W_c$ and the length $L_c$ of the grid cell 122.

In the X and Y directions, neighboring grid cells 122 are arranged in contact with each other such that there is no space there-between.

In a storage grid 104, a majority of the grid columns are storage columns 105, i.e. grid columns 105 where storage containers 106 are stored in stacks 107. However, a grid 104 normally has at least one grid column which is used not for storing storage containers 106, but which comprises a location where the container handling vehicles 200,300 can drop off and/or pick up storage containers 106 so that they can be transported to a second location (not shown) where the storage containers 106 can be accessed from outside of the grid 104 or transferred out of or into the grid 104. Within the art, such a location is normally referred to as a "port" and the grid column in which the port is located may be referred to as a "delivery column" 1 19,120. The drop-off and pick-up ports of the container handling vehicles are referred to as the "upper ports of a delivery column" 1 19,120. While the opposite end of the delivery column is referred to as the "lower ports of a delivery column".

The storage grids 104 in FIGS. 1A and 1C comprise two delivery columns 119 and 120. The first delivery column 119 may for example comprise a dedicated drop-off port where the container handling vehicles 200,300 can drop off storage containers 106 to be transported through the delivery column 119 and further to an access or a transfer station (not shown), and the second delivery column 120 may comprise a dedicated pick-up port where the container handling vehicles 200,300 can pick up storage containers 106 that have been transported through the delivery column 120 from an access or a transfer station (not shown). Each of the ports of the first and second delivery column 119,120 may comprise a port suitable for both pick up and drop of storage containers 106.

The second location may typically be a picking or a stocking station where product items are removed from or positioned into the storage containers 106. In a picking or a stocking station, the storage containers 106 are normally never removed from the automated storage and retrieval system 1, but are returned into the storage grid 104 once accessed. For transfer of storage containers out or into the storage grid 104, there are also lower ports provided in a delivery column, such lower ports are e.g. for transferring storage containers 106 to another storage facility (e.g. to another storage grid), directly to a transport vehicle (e.g. a train or a lorry), or to a production facility.

For monitoring and controlling the automated storage and retrieval system 1 (e.g. monitoring and controlling the location of respective storage containers 106 within the storage grid 104; the content of each storage container 106; and the movement of the container handling vehicles 200, 300 so that a desired storage container 106 can be delivered to the desired location at the desired time without the container handling vehicles 200,300 colliding with each other), the automated storage and retrieval system 1 comprises a control system (not shown) which typically is computerized and which typically comprises a database for keeping track of the storage containers 106.

A conveyor system comprising conveyors may be employed to transport the storage containers between the lower port of the delivery column 119,120 and the access station.

If the lower port of the delivery column 119,120 and the access station are located at different levels, the conveyor system may comprise a lift device for transporting the storage containers 106 vertically between the port and the access station.

The conveyor system may be arranged to transfer storage containers between different grids, e.g., as is described in WO2014/075937A1, the contents of which are incorporated herein by reference.

Further, WO2016/198467A1, the contents of which are incorporated herein by reference, disclose an example of a prior art access system having conveyor belts (FIGS. 5a and 5b in WO2016/198467A1) and a frame mounted rail (FIGS. 6a and 6b in WO2016/198467A1) for transporting storage containers between delivery columns and work stations where operators can access the storage containers.

When a storage container 106 stored in the grid 104 disclosed in FIG. 1A is to be accessed, one of the container handling vehicles 200,300 is instructed to retrieve the target storage container 106 from its position in the grid 104 and to transport it to or through the delivery column 119. This operation involves moving the container handling vehicle 200,300 to a grid location above the storage column 105 in which the target storage container 106 is positioned, retrieving the storage container 106 from the storage column 105 using the container handling vehicle's lifting device (not shown), and transporting the storage container 106 to the delivery column 119. If the target storage container 106 is located deep within a stack 107, i.e. with one or a plurality of other storage containers positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle 200,300 that is subsequently used for transporting the target storage container 106 to the delivery column, or with one or a plurality of other cooperating container handling vehicles 200,300. Alternatively, or in addition, the automated storage and retrieval system 1 may have container handling vehicles 200,300 specifically dedicated to the task of temporarily removing storage containers 106 from a storage column 105. Once the target storage container 106 has been removed from the storage column 105, the temporarily removed storage containers can be repositioned into the original storage column 105. However, the removed storage containers may alternatively be relocated to other storage columns 105.

When a storage container 106 is to be stored in the grid 104, one of the container handling vehicles 200,300 is instructed to pick up the storage container 106 from the delivery column 120 and to transport it to a grid location above the storage column 105 where it is to be stored. After any storage containers positioned at or above the target position within the storage column stack 107 have been removed, the container handling vehicle 200,300 positions the storage container 106 at the desired position. The removed storage containers may then be lowered back into the storage column 105, or relocated to other storage columns 105.

A problem with the prior art displacement mechanism illustrated in FIG. 3 is that the slots 11 are slightly larger than the displaceable bar 7, there is therefore a small swinging movement at the top of the displacement plates 2, rendering the movement of these slightly unstable. Furthermore, the displaceable bar 7 requires space to be moved up and down, which leaves less space for other components in the upper part of the vehicle. Yet another problem is that the locking solution in FIG. 3 is unreliable and complicated.

In view of the above, it is desirable to provide a displacement mechanism that solves or at least mitigates one or more of the aforementioned problems related to the use of prior art displacement mechanisms.

SUMMARY OF THE INVENTION

The invention is set forth in the independent claims and the dependent claims describe alternatives of the invention.

The invention may, in a first aspect, relate to a displacement mechanism for a remotely operated vehicle, the displacement mechanism being for raising and lowering wheels onto a rail system that the remotely operated vehicle runs on, the displacement mechanism comprising: a motor for providing rotational drive; a drive crank coupled to the motor to transmit rotational drive from the motor; a coupler link pivotally coupled to the drive crank; a lift rocker pivotally coupled to the coupler link, the coupler link coupling rotational drive from the drive crank to the lift rocker; a displacement link pivotally coupled to the lift rocker; and a displacement plate provided with wheels, the displacement plate being configured to slide in a frame of the remotely operated vehicle, wherein the displacement plate is pivotally coupled to the displacement link, such that the lift rocker, displacement link and displacement plate act as a rocker slider mechanism that raises and lowers the displacement plate, and hence the wheels.

Thus, the pivotal coupling of the drive crank to the lift rocker via the coupler link acts as a four-bar linkage mechanism, transferring rotational drive from the motor and drive crank to the lift rocker. The coupled rotational drive from the motor to the lift rocker is further transferred into linear movement by the rocker slider mechanism made up of the lift rocker, displacement link and displacement plate, and thereby the displacement plate is linearly moved with respect to the frame of the remotely operated vehicle. The pivotal couplings of the mechanism substantially improve the reliability of the mechanism in comparison to prior art solutions. The four-bar linkage also provides gearing for the rocker slider mechanism, and a simpler locking mechanism between a lowered and a raised position of the displacement plate and thus the wheels.

The coupler link may have an arcuate shape. The arcuate shape of the coupler link may be formed by a curved shape, or two or more angles giving a corresponding number of sections. Preferably, the coupler link may have an arcuate shape having two angles forming three sections.

The coupler link, drive crank, lift rocker, displacement link and displacement plate may be coupled by pivots. The pivots may for example be formed by holes in the links, crank, rocker and/or plate, with pivot bolts, pivot bearings or other pivot devices as the person skilled in the art may find suitable based on the disclosure of the invention herein.

The displacement mechanism may be configured to be arranged in a lowered position, where the coupler link may straddle the pivot point of the drive crank, such that the pivots of the coupler link are positioned on opposite sides of the drive crank's pivot point. The arcuate shape of the coupler link may allow it to straddle the pivot point of the drive crank in the lowered position, and the shape may thus be adapted to ensure that the pivots of the coupler link can be positioned on opposite sides of the drive crank's pivot point. The coupler link straddling the pivot point of the drive crank may be defined as the pivot points of the coupler link being aligned with the drive crank's pivot point, or the drive crank's pivot point being arranged within a concave recess of the coupler link's arcuate shape relative to the pivot points of the coupler link. The coupler link may lock movement of the displacement mechanism in a lowered position, as any movement acting on the lift rocker will be transferred to the pivotal coupling between the lift rocker and coupler link. As the coupler link straddles the drive crank's pivot point, the lift rocker may only be able to press the coupler link further towards the said pivot point. In the lowered position, the wheels may be in contact with the rail system that the remotely operated vehicle runs on.

In the lowered position, the pivotal coupling between the displacement link and the lift rocker may be arranged to substantially align with the center line of the displacement plate. The lift rocker's pivot point may be offset with respect to the center line of the displacement plate. The upper pivot of the displacement link is eccentrically arranged to the pivot point of the lift rocker and will thus follow the rotation of the lift rocker. However, the distance from the lift rocker's pivot point to the pivot point of the displacement link is relatively small, and as the displacement plate may be linearly supported, by e.g. linear bearings, the displacement plate may only move in a vertical direction.

The pivot point of the displacement link on the lift rocker may be arranged at a shorter distance to a pivot point of the lift rocker than the distance from the pivot point of the coupler link on the lift rocker to the pivot point of the lift rocker. The relatively shorter distance from the lift rocker's pivot point to the pivotal coupling with the displacement link provides a gearing effect, such that the force required by the motor to move the displacement plate is relatively less than the force it would take for the displacement plate to affect movement of the motor. This gearing effect may thereby also contribute to locking the displacement mechanism in either a lowered or raised position.

In a raised position, the coupler link may straddle the pivot point of the lift rocker, such that the pivots of the coupler link are positioned on opposite sides of the lift rocker's pivot point. The coupler link straddling the pivot point of the drive crank may be defined as the pivot points of the coupler link being aligned with the lift rocker's pivot point, or the lift rocker's pivot point being arranged outside a concave recess of the coupler link's arcuate shape relative to the pivot points of the coupler link. Thus, in contrast to the lowered position, the coupler link may not have the pivot point of the lift rocker within the concave recess and a line defined by the two pivotal couplings of the coupler link. However, the coupler link may be locked in the raised position as any movement by the lift rocker will act to displace the pivotal coupling of the coupler link and the lift rocker upwards, which in turn may press the pivotal coupling of the coupler link and the drive crank down. At this point the drive crank, and/or the other parts of the mechanism may be limited in movement by a mechanical stop.

The drive crank may be arranged to move through an angle of more than 180 degrees between a raised position and a lowered position and the lift rocker may be arranged to move through an angle of more than 90 degrees between a raised position and a lowered position, such that the pivot point for the displacement link may be arranged to move through a height of between 2-40 mm, more preferably 10-30 mm, even more preferably 15-25 mm, for example 20-21 mm, between a raised position and a lowered position. Preferably, the drive crank may be arranged to move through an angle of 200 degrees, and the lift rocker may be arranged to move through an angle of 106 degrees.

The drive crank's movement may be limited by stops. The stops may comprise corresponding indentations and protrusions. For example, there may be arranged protruding stops radially arranged from the pivot point of the drive crank, the stops being arranged such that they allow rotation of the drive crank through more than 180 degrees. On the drive crank there may for example be arranged corresponding indentations, the indentations being arranged such that the protrusions are received by said indentations.

The displacement plate may be provided with two wheels, and the displacement link may be pivotally coupled to the displacement plate along a center line of the displacement plate. Said centerline of the displacement plate may be a vertical line extending upwards from a point in between the two wheels of the displacement plate.

The displacement plate may comprise a connecting plate section and a wheel plate section and the wheels may be provided on the wheel plate section. The connecting plate section may thus be rigidly connected to the wheel plate section and may provide a mechanical link extending from an upper part of the remotely operated vehicle, past a container receiving space and to the wheel plate section. In certain configurations, typical for remotely operated vehicles which may not comprise a container receiving space, the displacement plate may only comprise a wheel plate section pivotally coupled to a displacement link.

The connecting plate section may be coupled to an upper frame part of the remotely operated vehicle with a linear bearing.

The wheel plate section may be coupled to a lower end of the frame of the remotely operated vehicle with a linear bearing.

The linear bearing(s) may comprise sliding bearings, ball bearings, bearings comprising wheels or any other kinds of linear displacement devices which are known in the art.

The lift rocker may be rigidly coupled to a lift shaft for coupling rotational movement to a second side lift rocker arranged on the opposite side of the remotely operated vehicle.

A second side displacement link may be pivotally coupled to the second side lift rocker and a second side displacement plate may be provided with wheels, the second side displacement plate being configured to slide in a frame of the remotely operated vehicle (which might be an opposite side of the previously mentioned frame), wherein the second side displacement plate may be pivotally coupled to the second side displacement link, such that the second side lift rocker, second side displacement link and second side displacement plate act as a rocker slider mechanism that raises and lowers the second side displacement plate, and hence the wheels. Thus, the displacement mechanism on a first side may act as a master displacement mechanism, where rotation movement is transferred via a lift shaft to a slave mechanism on the other side of the remotely operated vehicle. In other configurations, there may be two displacement mechanisms each comprising a motor, drive crank, coupler link, lift rocker, displacement link and displacement plate and each arranged on opposite sides of a remotely operated vehicle. In such configurations, the two displacement mechanisms may be rigidly coupled by a lift shaft to ensure synchronized movement, or each mechanism may comprise a lift shaft where the lift shafts are coupled by a shaft coupling. The two displacement mechanisms may also not be mechanically coupled, but their movements may be synchronized by a control unit.

The drive crank or a shaft of the drive crank, may be provided with a mechanical interface adapted for applying torque manually to the drive crank of the displacement mechanism. The mechanical interface may for example comprise a hexagonal bolt, splined fittings, allen key recesses or any coupling arrangement for allowing a tool to be fitted to said interface and manually rotate the drive crank. Thus, should a remotely operated vehicle fail, it may be moved manually or by a service vehicle and the wheels may be lifted or lowered by an external force.

In a second aspect, the invention may relate to a remotely operated vehicle comprising a displacement mechanism according to any of the configurations of the aforementioned aspect.

In an aspect, the invention may relate to a method for raising and lowering the wheels of a remotely operated vehicle with a displacement mechanism according to any of the configurations of the first aspect, wherein the method comprises the steps of:
 rotating the drive crank by providing rotational drive from the motor,
 displacing the coupler link through rotation of the drive crank,
 rotating the lift rocker through displacement of the coupler link,
 displacing the displacement link through rotation of the lift rocker,
 displacing the displacement plate, and hence the wheels, through displacement of the displacement link.

The method may comprise the steps of:
 rotating a lift shaft through rotation of the lift rocker,
 rotating a second side lift rocker arranged to the opposite side of the remotely operated vehicle through rotation of the lift shaft,
 displacing a second side displacement link through rotation of the second side lift rocker,
 displacing a second side displacement plate and wheels provided on the second side displacement plate, through displacement of the second side displacement link.

Thus, the displacement mechanism arranged on a first side of the remotely operated vehicle may act as a master mechanism, and the mechanism arranged on a second side of the vehicle may act as a slave mechanism actuated by the master mechanism. In other configurations, where a remotely operated vehicle displacement mechanism comprises two displacement mechanisms, either mechanically coupled or not, the method may comprise the steps of simultaneously rotating the drive cranks to ensure synchronized lifting or lowering of the wheels to both sides of the vehicle.

In an aspect, the invention may relate to an automated storage and retrieval system comprising: a rail system comprising a first set of parallel rails arranged in a horizontal plane and extending in a first direction, and a second set of parallel rails arranged in the horizontal plane and extending in a second direction which is orthogonal to the first direction, which first and second sets of rails form a grid pattern in the horizontal plane comprising a plurality of adjacent grid cells wherein the automated storage and retrieval system comprises at least one remotely operated vehicle according to the second aspect.

In the following description, numerous specific details are introduced by way of example only to provide a thorough understanding of embodiments of the claimed device, system and method. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

BRIEF DESCRIPTION OF THE DRAWINGS

The following drawings depict exemplary embodiments of the present invention and are appended to facilitate the understanding of the invention.

FIG. 1A and FIG. 1C show the complete system and FIG. 1B and FIG. 1D show examples of system operable prior art container handling vehicles.

FIG. 2A shows a single track system, FIG. 2B shows a double track system 2B and FIG. 2C shows a double track system indicated width and length of a container handling vehicle grid cell.

FIGS. 3A-B are perspective views of the container handling vehicle of FIG. 1B, where the side walls and top cover have been removed to expose the prior art displacement mechanism.

FIGS. 7A-B are perspective views of a fourth container handling vehicle stripped of side walls to expose a displacement mechanism arranged in respectively a lowered position and a raised position.

FIG. 9A is a perspective view of a remotely operated vehicle.

FIG. 9B is a perspective view of a remotely operated vehicle where a wheel displacement plate is removed to expose a displacement mechanism.

DETAILED DESCRIPTION OF THE INVENTION

Figure 1:
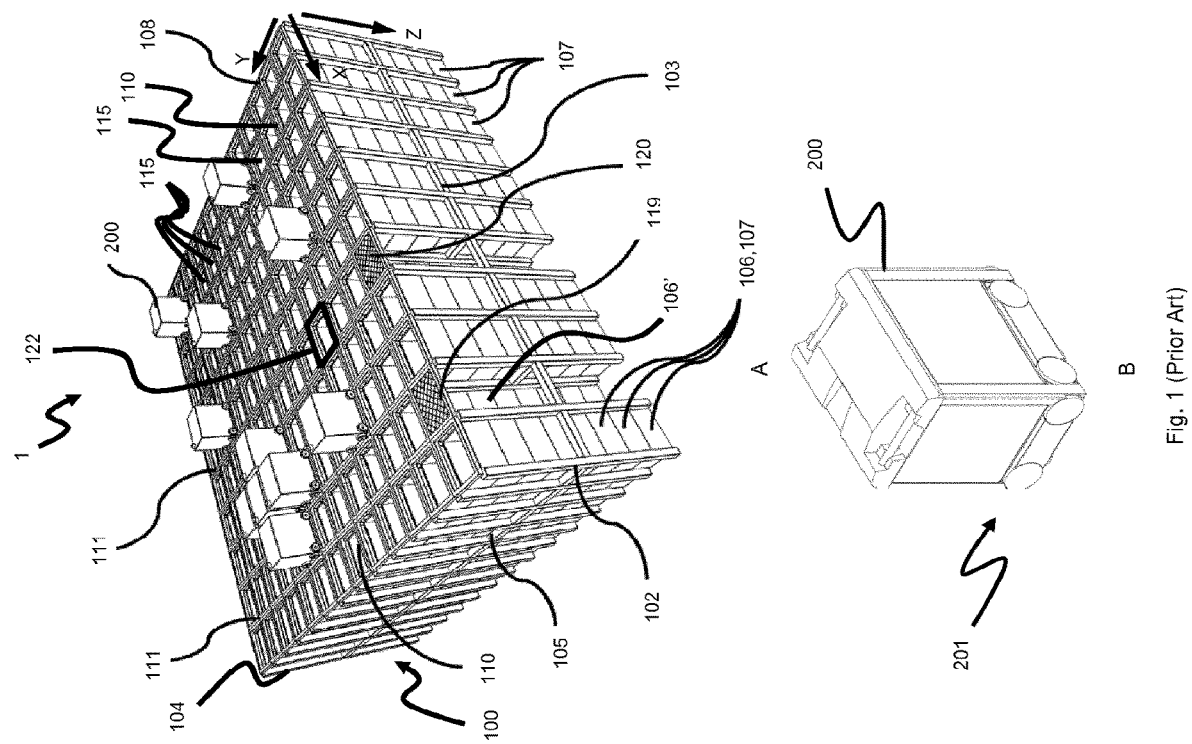
FIGS. 1A-D are perspectives view of a prior art automated storage and retrieval system, where
Figure 1:
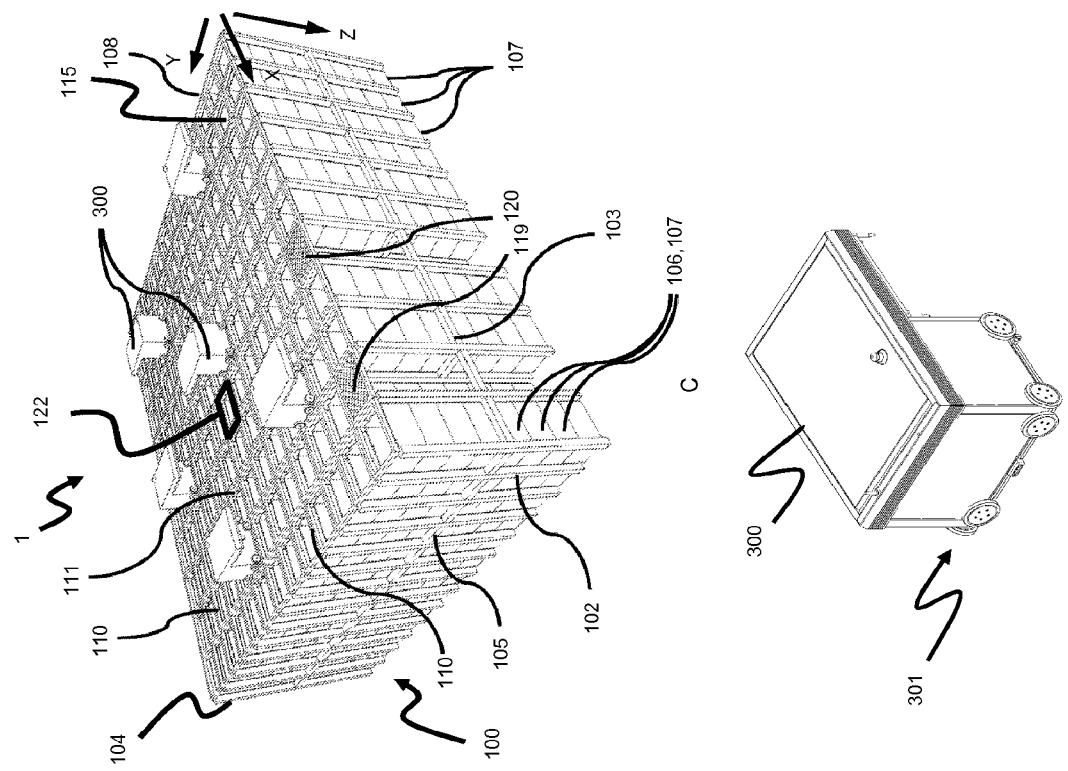
Figure 2:
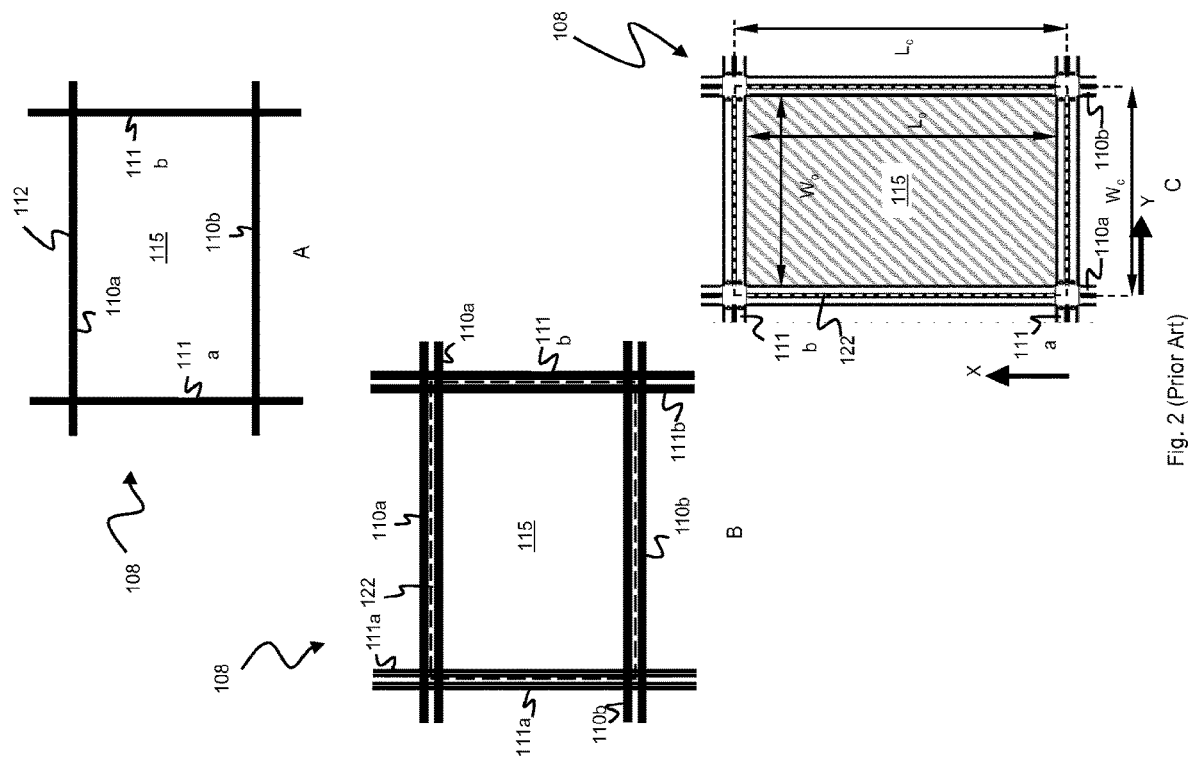
FIGS. 2A-C is a top view of a container handling vehicle rail system, where

In the following, embodiments of the invention will be discussed in more detail with reference to the appended drawings. It should be understood, however, that the drawings are not intended to limit the invention to the subject-matter depicted in the drawings. Furthermore, even if some of the features are described in relation to embodiments of specific vehicles, it is apparent that they are valid for the other vehicles, the system, wheel displacement assemblies and related methods as well, and vice versa. Hence, any features described in relation to the displacement mechanism only, and/or related methods, are also valid for the vehicles and the system.

FIG. 4A illustrates a first embodiment of the invention, where a first side 35 of a remotely operated vehicle, exemplified as a third container handling vehicle 400, is stripped of side plates thus exposing a displacement mechanism 16. The displacement mechanism 16 illustrated in this particular configuration is configured to simultaneously lift or lower a first wheel set of four wheels 25. The set of four wheels are provided on separate wheel plate sections 23,23' of displacement plates 23, 23', 41,41' arranged at a lower end of the third container handling vehicle 400. A first wheel plate section 23 is visible in FIG. 4A provided with two wheels 25, whilst a second wheel plate section 23' is arranged on a second side of the third container handling vehicle 400 which is shown in FIG. 5A and is also provided with two wheels 25.

Figure 4:
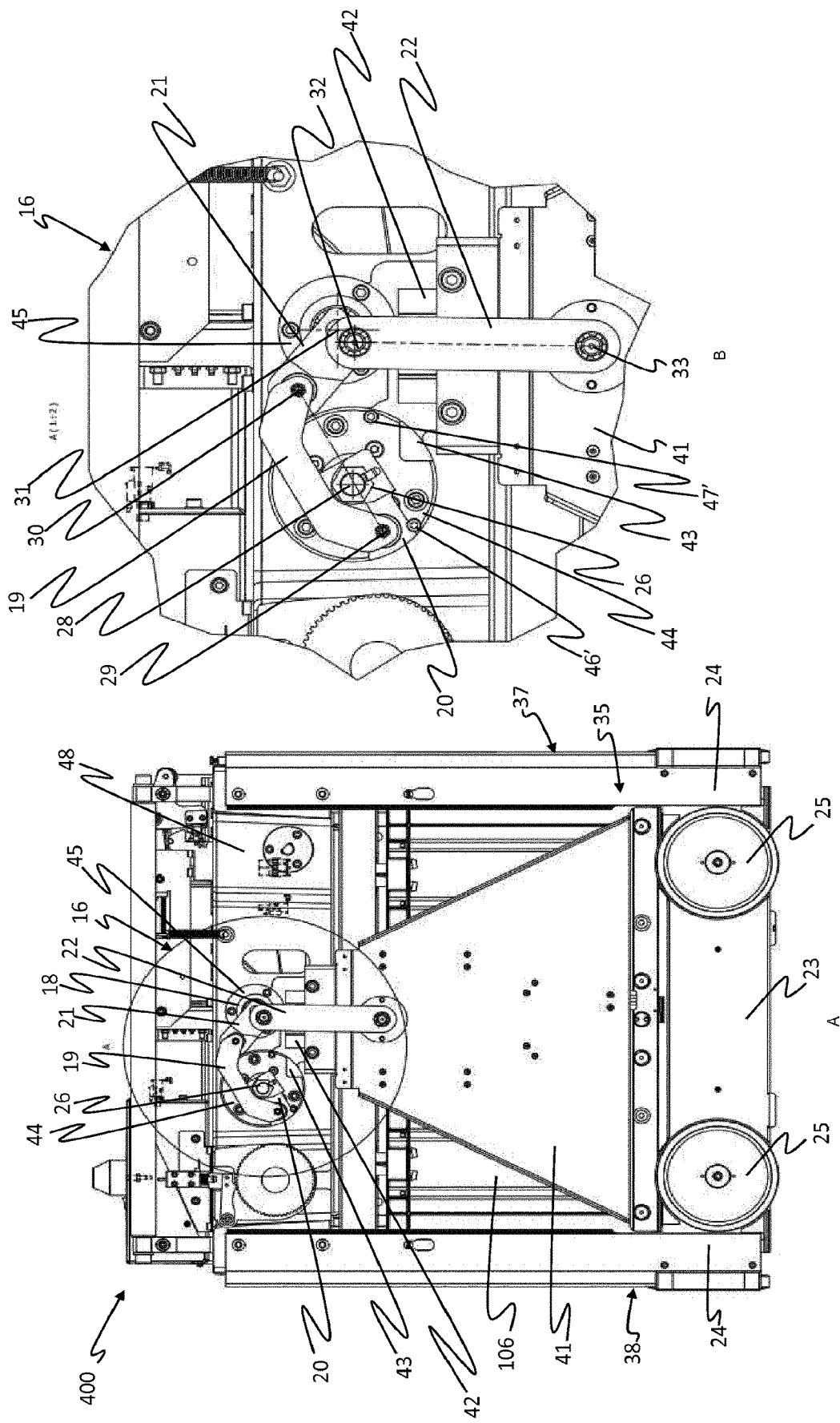
FIG. 4A is a side view of a first side of a third container handling vehicle stripped of side walls to expose a displacement mechanism.
FIG. 4B is a side view of the displacement mechanism of FIG. 4A.
Figure 5:
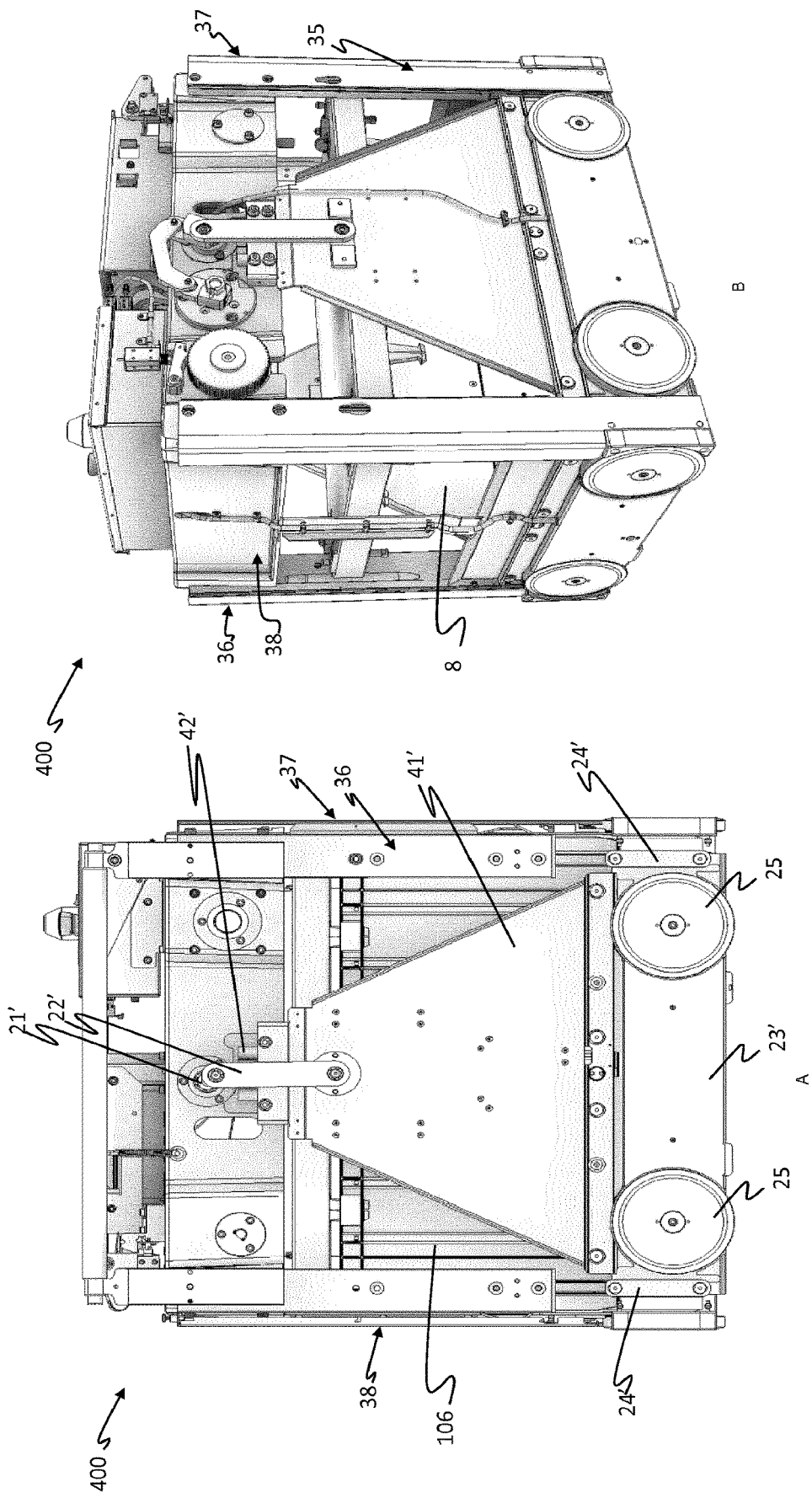
FIGS. 5A and 5B are respectively a side view and a perspective view of a third container vehicle stripped of side walls to expose a displacement mechanism.

The first embodiment, illustrated in FIGS. 4-5, comprises a third container handling vehicle 400 with a footprint, i.e. an extent in the first X and second Y directions, which is generally equal to the lateral extent of a grid cell 122, and comprises a container receiving space 8 similar to that of the first container handling vehicle 200.

In FIG. 4A, a storage container 106 is illustrated occupying the container receiving space 8. Some of the displacement mechanism 16 may preferably be arranged above the container receiving space 8 for container handling vehicles 400,500,700 configured with a container receiving space 8, so as not to block the lifting and lowering of storage containers 106 into and out of said container receiving space 8. In configurations of container handling vehicles 400,500, 700 comprising a container receiving space 8, the wheel plate sections 23,23' may be connected to upper parts of the displacement mechanism 16 by connecting plate sections 41,41'. The connecting plate sections 41,41' may extend from an upper frame part 48 of a container handling vehicle 400,500,700 along sidewalls and to the wheel plate sections 23,23', the connecting plate sections 41,41' and wheel plate sections 23,23' being rigidly connected.

In order to ensure stable and smooth movement of the connecting plate sections 41,41' in a vertical direction, a linear displacement device 42, for example a linear bearing or sliding rail, may be arranged connecting the connecting plates sections 41,41' and the upper frame part 48, each illustrated in FIG. 4A and FIG. 5A. Linear displacement devices 24,24' may also be provided to ensure smooth vertical movement of the wheel plate sections 23,23'. These are covered by corner frames in FIG. 4A, but can be seen arranged at each lateral end of the second side wheel plate section 23' in FIG. 5A.

In the embodiment of FIG. 4A, the connecting plate sections 41,41' are vertically displaced by a four bar linkage mechanism coupled with a rocker slider mechanism.

FIG. 4B is a zoomed in illustration of the upper part of displacement mechanism 16 of FIG. 4A, further illustrating the various parts and rotational points of the displacement mechanism 16. Although FIG. 4B shows a displacement mechanism 16 arranged in a third container handling vehicle 400, it will be apparent that the motor, crank, links, plates, shafts etc. illustrated therein may be common to the various embodiments of the invention and adapted for use according to the specific arrangement of the remotely operated vehicles 400,500,600,700 wherein a displacement mechanism 16 is arranged.

A motor 17 for providing rotational drive, not visible in FIG. 4A, comprising for example an electric motor, is arranged interior to the upper frame part 48 of the third container handling vehicle 400. The motor 17 may be rigidly connected to an upper frame part 48 by a motor flange 44 provided on said upper frame part 48. The motor flange 44 comprises a recess 43 allowing the first side connecting plate section 41 to be fully brought to a raised position, as the motor flange 44 would otherwise pose a mechanical constraint. A drive shaft, not shown, is arranged extending from the motor 17 and through the upper frame part 48 such that it extends exterior to the upper frame part 48.

Illustrated in FIG. 4A a mechanical interface 26, exemplified as a hexagonal bolt head 26, is arranged at an end of the drive shaft distal to the motor 17. The hexagonal bolt head 26 may be arranged such that a corresponding tool can be connected to said bolt head 26 and thereby manually rotate the drive shaft around its axis of rotation 28. Though a hexagonal bolt head 26 has been used as an example of a mechanical interface in this embodiment, other interfaces are possible—e.g., splined fittings, allen key recesses or any coupling arrangement for allowing a tool to be introduced to manually crank the motor 17 responsible for displacing the wheels 25, as will be apparent to the person skilled in the art based on the disclosure of the invention herein.

A drive crank 20 is shown arranged exterior to the upper frame part 48, rigidly connected to the drive shaft at a first end of the drive crank 20. The drive crank 20 extends in a direction from the pivot point 28 of the drive shaft and radially outwards, such that a second end of the drive crank 20 may also be rotated by the rotation of the drive shaft. At the second end of the drive crank 20, a first end of a coupler link 19 is rotationally attached at a pivot 29 to the second end of the drive crank 20. A second end of the coupler link 19 is rotationally attached at a pivot 30 to a first end of a first side lift rocker 21, and the first side lift rocker 21 is rigidly attached to a lift shaft 18. The pivot 30 is arranged eccentrically to the pivot point 31, such that the pivot 30 at the first end of the first side lift rocker 21 rotates around the pivot point 31 of said lift shaft 18.

The coupler link 19 has an arcuate shape, such that its body does not extend along a line which may be drawn up between its two pivot points 29,30, but instead has concave recess or cut-out as illustrated in FIG. 4B. The arcuate shape may be shaped such that the coupler link 19 has three segments formed by two angles as is shown in the Figures, but the shape may also be curved i.e. without hard angles. On the opposite side to the concave recess, the coupler link 19 may have a convex shape, thus giving the coupler link 19 an arcuate shape. The arcuate shape of the coupler link 19 allows the drive crank 20 to bring the coupler link 19 to a position where the first pivot point 29 of the coupler link 19 is brought past the pivot point 28 of the drive crank 20, such that the pivot point 28 of the drive crank 20 lies between the first and the second pivot points 29,30 of the coupler link 19, as illustrated in FIG. 4B.

When the drive crank 20 is rotated through around 200 degrees, the coupler link 19 acts as gearing and causes the first side lift rocker 21 to move through approximately 105 degrees. The first side lift rocker 21, illustrated in FIG. 4A, is at a second end pivotally coupled to a first end of a first side displacement link 22 at pivot point 32. The pivot point 32 of the displacement link 22 is arranged eccentrically to the pivot point 31 of the first side lift rocker 21. The distance from the pivot point 30 of the coupler link 19 to the pivot point 31 of the lift rocker 21, is relatively smaller than the distance from the pivot point 32 of the displacement link 22 to pivot point of the lift rocker 21, thereby providing a gearing effect between the coupler link 19 and the displacement link 22. The upper end of the displacement link 22 is therefore moved along the radius of the pivot point 32 around the lift rocker's 21 pivot point 31. The pivot point 31 is offset from a centerline of the displacement plate 23, 23', 41,41', thereby aligning the movement of pivot point 32 with said centerline. As the displacement link 22 is pivotally coupled to the displacement plate 23,23',41,41', and the displacement plate 23,23',41,41' is connected to the upper frame part 48 by a linear bearing, the displacement plate's 23, 23',41,41' movement may be purely linear.

Thus, through the rotation of the drive shaft by the motor 17, linear movement of the first side connecting plate section 41 may be achieved, and as the first side connecting plate section 41 is rigidly connected to the first side wheel plate section 23 in the embodiment of FIG. 4, the wheels 25 are lifted and lowered accordingly. The remotely operated vehicles exemplified as third 400, fourth 500 and fifth 700 container handling vehicles of FIGS. 5, 6, 7, 8 and 10 all comprise a container receiving space 8, and thus also comprise a similar configuration of the displacement mechanism 16 comprising connecting plate sections 41,41' as in FIG. 4. The remotely operated vehicle exemplified as a container delivery vehicle 600 of FIG. 9 however, as will be described in further detail later, does not comprise a container receiving space 8 and the displacement links 22,22' in this configuration may therefore be directly connected to the wheel plate sections 23,23'.

FIG. 5A illustrates a first embodiment, similar to that of FIG. 4A, but in a view where a second side 36 of the third container handling vehicle 400 is stripped of side plates thus exposing a second side of a displacement mechanism 16. The perspective view in FIG. 5B is of the same embodiment as FIGS. 4A, 4B and 5A, and illustrates that the second side 36 of the third container handling vehicle 400 is arranged opposite to the first side 35. Similarly, all the remotely operated vehicles 300,400,500,600 comprise four sides 35,36,37,38 forming a rectangular cross section, the first side 35 and fourth side 38 of the third container handling vehicle 400 being visible in FIG. 5B. Furthermore, the perspective view in FIG. 5B discloses that in this exemplary embodiment only one set of wheels 25 on the first side 35 and the second side 36 are configured for displacement, the wheels 25 on the third side 37 and fourth side 38 are not vertically displaceable. However, in other configurations the remotely operated vehicles may comprise one or more sets of displaceable wheels.

Thus, the lift shaft 18 extends from exterior to the first side 35 of the upper frame part 48 to exterior to the second side 36 of the upper frame part 48 of the third container handling vehicle 400. As the lift shaft 18 is rotated by the action of the coupler link 19 working on the first side lift rocker 21, the rotational movement of said lift shaft 18 extends to the parts of the displacement mechanism 16 arranged to the second side 36 of the container handling vehicle 400. At the second side 35, the lift shaft 18 is rigidly attached to a second side lift rocker 21'. The second side lift rocker 21' may not require attachment to a coupler link 19, in the embodiment disclosed in FIG. 5, and thus only extends from a first end rigidly attached to the lift shaft 18 at its pivot point 31 and in a radial direction outwards such that a second side displacement link 22' is rotationally attached at second end of the second side lift rocker 21'. The distance from the pivot point 31 of the second side lift rocker 21' to the pivot point of the second side displacement link 22' may preferably correspond to that of the corresponding parts on the first side 35 of the displacement mechanism 16. The first side lift rocker 21 and the second side lift rocker 21' may thus be configured such that their pivotal coupling to a displacement link 22,22', causes simultaneous and corresponding linear displacement of the connecting plate sections 41,41' during rotation of the lift shaft 18.

Similar to the first side 35, the second side connecting plate section 4G is connected to the upper frame part 48 by a linear displacement device 42', for example a linear bearing or sliding rail, and the second side wheel plate section 23' is connected to a lower end of the frame of the container handling vehicle 400 by linear displacement devices 24', for example linear bearings or sliding rails, arranged at each end of the wheel plate section 23' by the corners of the vehicle frame illustrated in FIG. 5A where the corner frames have been removed for illustrative purposes.

The remotely operated vehicles of FIGS. 6-9 may comprise a similar configuration of a displacement mechanism 16 as illustrated in FIGS. 4 and 5 in that these comprise only one motor 17 connected to a first side 25 of the remotely operated vehicles 400,500,600. The displacement of the second side wheel plate section 23' is actuated by a lift shaft 18 extending through an upper frame part 48 of the remotely operated vehicle 400,500,600.

In other configurations, the displacement mechanism 16 does not comprise a lift shaft 18 extending between two interconnected mechanisms for lifting the wheel displacement plates 23,23'. Instead, each set of wheel displacement plates 23 may comprise a displacement mechanism 16 similar to that arranged on the first side 35 of the third container handling vehicle 400 in FIG. 4, though without the interconnected lift shaft 18 such that the vehicle comprises two displacement motors 17, drive cranks 20 and coupler links 19 for displacing the respective wheels 25 on each side 25,26—thereby allowing independent displacement of each wheel displacement plate 23,23'. In further configurations, a container handling vehicle may be arranged with two wheel displacement assemblies 16 similar to that of the first side 35 in FIG. 4, but where the assemblies 16 are connected together by a common lift shaft 18, or a lift shaft 18 from each side 35,36 are connected together in a coupling to ensure simultaneous and corresponding displacement of both wheel displacement plates 16.

FIG. 6A-B illustrates a second embodiment of the invention, where a remotely operated vehicle, exemplified as a fourth container handling vehicle 500 comprises a displacement mechanism 16. The fourth container handling vehicle 500 may have a footprint substantially equal to the dimension of a grid cell in one direction X,Y and in the other direction X,Y larger than the dimension of a grid cell 122 in said other direction X,Y, such that part of the vehicle body extends into a neighboring cell 122. This extension of the vehicle body into the neighboring cell is 122 of a size less than half the lateral extent of the cell 122 in the direction of the grid cell opening 115 in the neighboring cell 122. In other words, the footprint is substantially equal to the dimension of one grid cell 122 by slightly less than one and a half grid cells 122. Thereby, similar container handling vehicles travelling in the same direction can pass each other, whilst occupying three grid cells 122. The extension of the vehicle body into the neighboring cell 122 may be due to the presence of a second section 49, as illustrated in FIG. 6A-B, the second section 49 may accommodate batteries and/or larger and stronger motors for driving the wheels.

Figure 6:
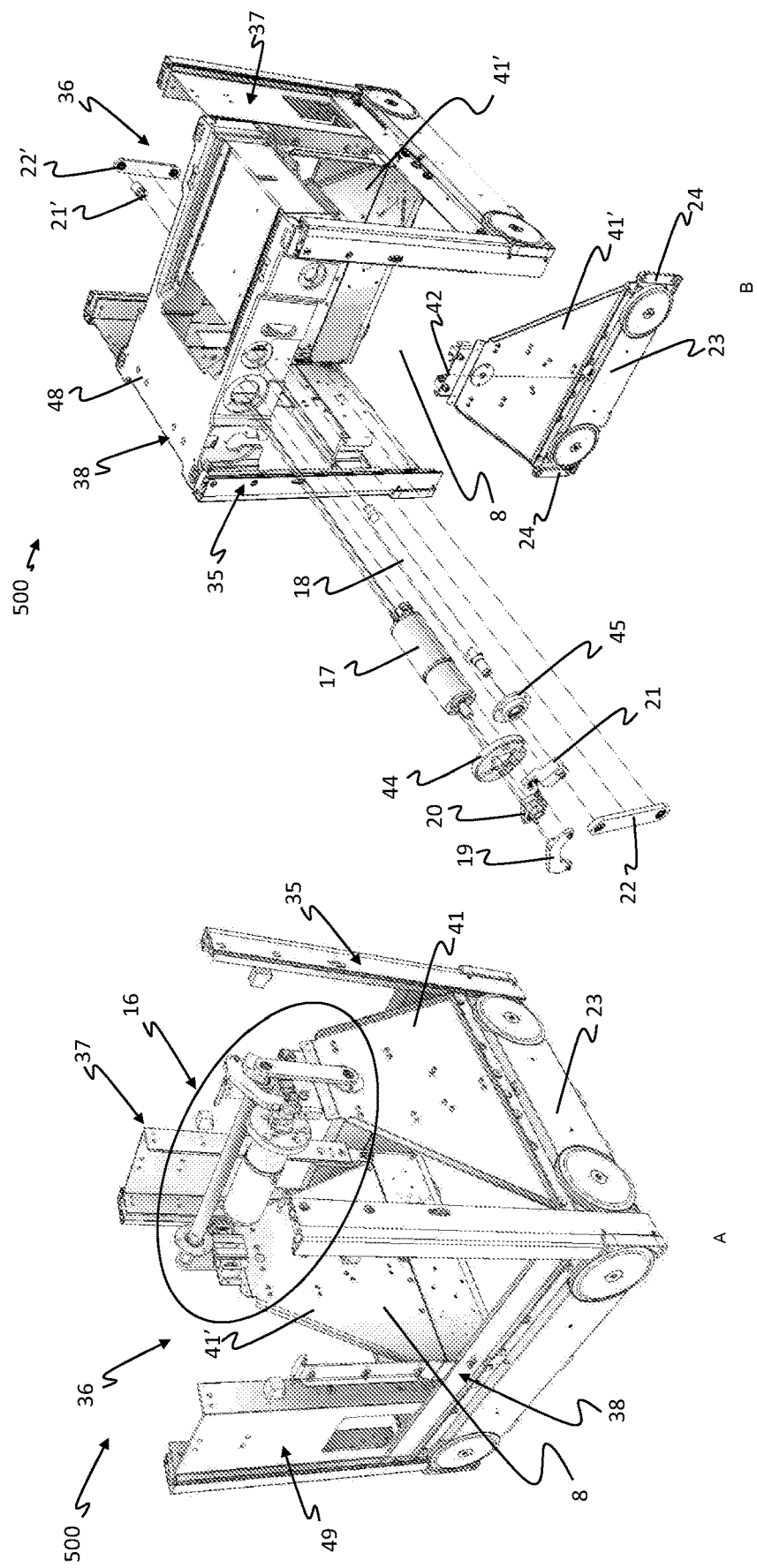
FIG. 6A is a perspective view of a fourth container handling vehicle stripped of side walls and certain upper components to expose displacement mechanism.
FIG. 6B is a perspective view of a fourth container handling vehicle stripped of side walls, and where the displacement mechanism is shown in an exploded view to expose each component of said mechanism.

The displacement mechanism 16 of the fourth container handling vehicle 500 illustrated in FIG. 6A-B is arranged above a container receiving space 8 of the vehicle body. In FIG. 6A, the panels of the container handling vehicle 500 have been stripped and several of the upper components have been removed including the upper frame part 48, to expose the displacement mechanism 16 as it extends over the container receiving space 8. Thus, the set of wheels 25 displaceable by the displacement mechanism 16 are adapted for engagement with a parallel set of rails, and the displacement mechanism 16 in FIG. 6 does not extend across entirely to the second side 36 of the container handling vehicle 500. For the sake of simplicity, the parts of the displacement mechanism 16 in the fourth container handling vehicle 500 arranged towards the second side 36 are referred to herein as of the second side 36.

FIG. 6B illustrates a displacement mechanism 16 of the fourth container handling vehicle 500 in an exploded view. In FIG. 6B, the panels of the vehicle 500, and several upper components have been stripped, though not the upper frame part 48 in contrast to FIG. 6A, so as to illustrate the points of attachment and pivot points of the different parts of the displacement mechanism 16 to the upper frame part 48. The parts of the displacement mechanism 16 are illustrated in an exploded view along their respective axes of rotation.

FIGS. 7A and 7B illustrate the first side of a displacement mechanism 16 of a fourth container handling vehicle 500 in respectively a lowered position and a raised position. The fourth container handling vehicle 500 is used herein to illustrate the difference between the raised and lowered position, but these positions may be common to the embodiments of remotely operated vehicles 400,500,600,700 in FIGS. 4-9 as will be apparent based on the disclosure of the invention herein. In contrast to the extremes of the raised and lowered position, FIG. 5B illustrates a displacement mechanism 16 in a position between the raised position and lowered position.

Two pairs of parallel dashed lines are traced at respectively an upper end and a lower end of the fourth container handling vehicle 500 illustrated in FIGS. 7A and 7B. The displacement distance Az between the two dashed lines illustrates the travelling distance of the upper displacement plates 41 and the wheel displacement plates 23 and thus the wheels 23, between the upper and lowered position. Said displacement distance Az may typically be between 2-40 mm, more preferably 10-30 mm, even more preferably 15-25 mm, for example 20-21 mm.

When the displacement mechanism 16 is arranged such that the wheels 25 are in the lowered position, as in FIG. 7A, the connecting plate section 41 is located at a lower end of the linear displacement device 42. FIG. 7A illustrates a displacement mechanism 16 in a similar position as in FIG. 4, where the coupler link 19 is in a position where the first pivot point 29 of the coupler link 19 is brought past the pivot point 28 of the drive crank 20. In this lowered position, the drive crank 20 is prevented from rotating further anticlockwise as it may be constrained by a lowered position stop 46', exemplified as a stop screw 46' in FIG. 4B, provided on the motor flange 44. The lowered position stop 46' is arranged such that it may engage with a lowered position stopping indentation 46 arranged on the drive crank 20.

The terms clockwise and anticlockwise are used herein with reference to the configurations disclosed in the figures, as seen towards the first side of a remotely operated vehicle. As will be apparent to the person skilled in the art based on the disclosure of the invention herein, the displacement mechanism 16 may also be arranged in mirror image configurations.

At the second end of the coupler link 19, the first end of the first side lift rocker 21 has been pulled by the coupler link 19 towards the motor 17 and thus brought the second end of the lift rocker 21 to its lowered position, as illustrated in FIG. 7A. The arcuate shape of the coupler link 19, and the engagement of the lowered position stopping indentation 46' with the lowered position stop 46 ensures that the displacement mechanism 16 is locked in a lowered position, as can be seen in FIGS. 4 and 7A. Together, the lowered position stop 46' and raised position stop 47' comprise the limit of rotational travel for the drive crank 20 in an anti-clockwise and a clockwise direction respectively. Thus, the angle the drive crank 20 may travel through may be around 190-210 degrees.

Should the wheels 25 experience an upward acting force in a lowered position, for example by driving over irregularities on or off the rails, the force will propagate to the displacement link 22 via the displacement plate 23,41. The displacement link 22 will however, not be able to rotate the lift rocker 21, because, as illustrated in FIG. 4B, the line between the two pivot points 29,31 of the coupler link 19 extends at least on or past the pivot point 28 of the drive crank 20, such that the coupler link straddles the pivot point 28 of the drive crank 20, with the two pivots 29,30 on each side of pivot point 28. The arcuate shape of the coupler link 19 ensures that any movement on the lift rocker 21 acts on the end of the coupler link 19 which is on the opposite side of the drive crank's 20 pivot point 28 to the other end of the coupler link 19. Thus, the force is pulling across the pivot point 28 will lock the coupler link 19 in the lowered position. Furthermore, the gearing effect of the lift rocker 21 between the coupler link 19 and the displacement link 22 also ensures that the force acting on the coupler link 19 is relatively weak. The coupler link 19 is thus locked in the lowered position against clockwise rotation, and may only be rotated clockwise by rotation of the drive crank 20.

FIG. 7B illustrates the connecting plate section 41 in a raised position, toward the upper end of the linear displacement device 42. The connecting plate section 41 is shown extending into the recess 43 and abutting the motor flange 44, which constrains further vertical movement in an upward direction. A dashed line is traced in FIG. 7B along the upper edge of the connecting plate section 41, to show the displacement distance Az from the lowered position which is illustrated by the lower of the two dashed lines.

Figure 8:
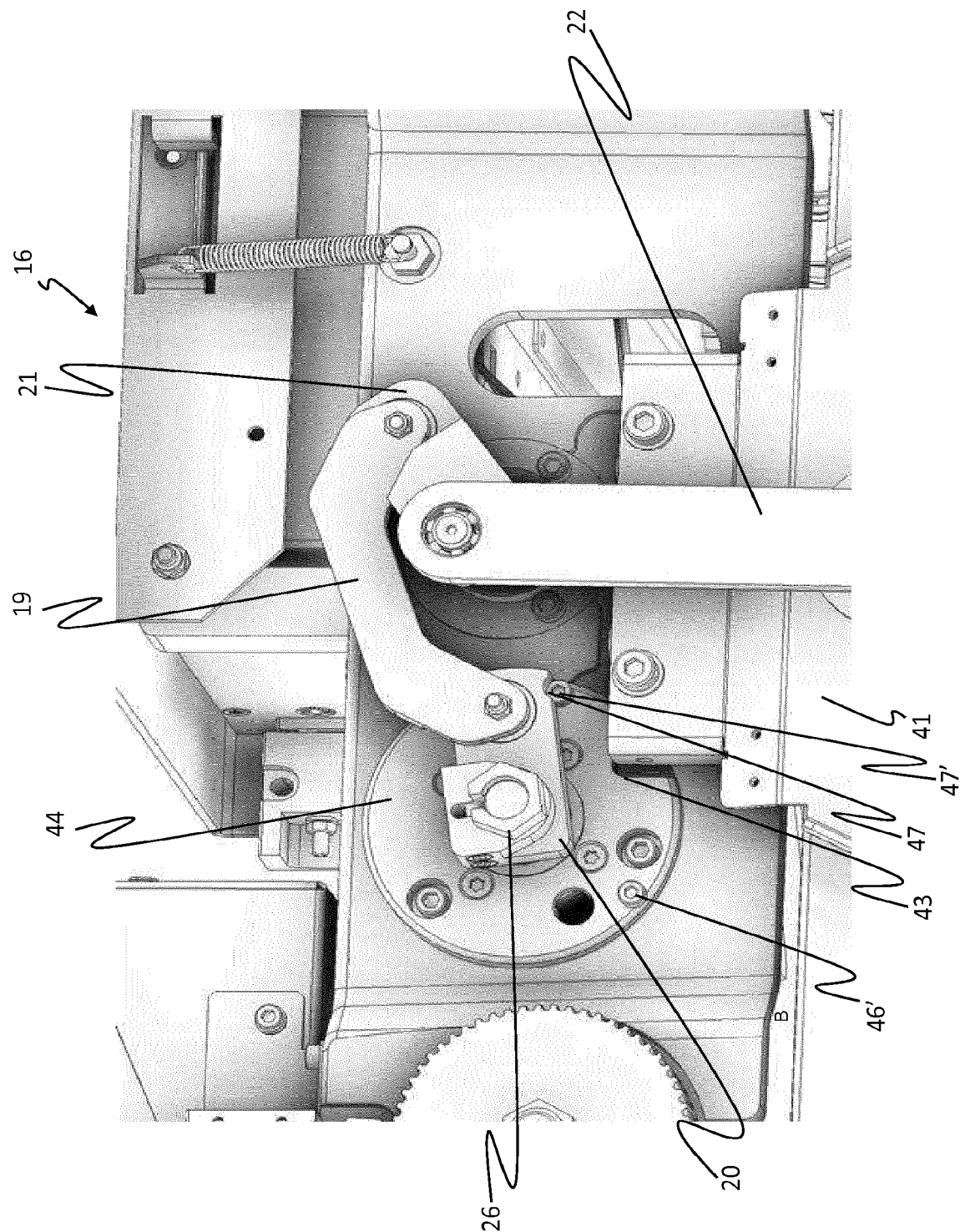
FIG. 8 is a side view of the displacement mechanism in a raised position.

In a raised position of the displacement mechanism 16, the drive crank 20 is rotated to its maximal position in the clockwise direction, as illustrated in FIG. 7B, and FIG. 8 which is a zoomed-in side view. In the raised position, a raised position stop 47', exemplified as a stop screw in FIG. 8, is provided on the motor flange 44 and prevents further clockwise rotation of the drive crank 20 as its movement is constrained by the raised position stop 47'. The second end of the coupler link 19 is moved with the first end of the first side lift rocker 21 in a clockwise direction of the lift shaft's pivot point 31, thus also moving the second end of the first side lift rocker 21 clockwise. The second end of the first side lift rocker 21 moves vertically as it rotates clockwise from a lowered position, thus bringing the first side displacement link 22 also from a lowered position to a raised position, until the first side lift rocker 21 is prevented from further rotation as the connecting plate section 41 abuts the motor flange 44 and the drive crank 20 is stopped against the raised position stop 47'.

A raised position stopping indentation 47 is provided on the drive crank 20 and is arranged such that it engages with the raised position stop 47' when the drive crank 20 is rotated to its maximal clockwise extent. As can be seen in FIG. 8, the displacement mechanism 16 is also locked in a raised position due to the arcuate shape of the coupler link 19. Should a vertical downward force act on the displacement link 22 in the raised position, the force will be transmitted to move the lift rocker's 20 first end anticlockwise with the coupler link's 19 second end. This movement will however cause the first end of the coupler link 19 to press the drive crank 20 further clockwise against the raised position locking protrusion 47'. Again, the gearing effect of the lift rocker 21 between the displacement link 22 and the coupler link 19 ensures that the force acting from the displacement link 22 to the coupler link 19 is relatively small. The drive crank 20 may thus be configured such that it may only be moved from a lowered position or a raised position by rotation of the motor's 17 driving shaft.

FIGS. 9A and 9B illustrate a displacement mechanism 16 configured for a remotely operated vehicle exemplified as a container delivery vehicle 600 for top-down receival of a storage container 106, and therefore comprises a container carrier 50 arranged above a vehicle body 51 to receive a storage container 106. The vehicle body 51 may function as a base module, such that a variety of different container carriers 50 or other equipment may be installed over the vehicle body 51. The container delivery vehicle 600 comprises for example a wheel arrangement of eight wheels 25 where a first set of four wheels enable the lateral movement of the container delivery vehicle 600 in the first X direction and a second set of the remaining four wheels enable the lateral movement in the Y direction. Each set of four wheels comprises a pair of wheels 25 provided on wheel plate sections 23,23' arranged on opposite sides of the vehicle's body 51. A set of wheels in the wheel arrangement can be lifted and lowered, so that the first set of wheels and/or the second set of wheels can be engaged with the respective set of rails at any one time.

A bolt head access aperture 34 is shown arranged in FIG. 9A extending through a first side wheel plate section 23. The bolt head access aperture 34 provides access to a hexagonal bolt head 26, such that a corresponding tool may be used to manually displace the wheel plate sections 23,23' if necessary without disassembling the vehicle 600. As can be seen in FIG. 9B, the location and size of the bolt head access aperture 34 corresponds to the location and size of the hexagonal bolt head 26. The bolt head access aperture 34 may also have an elongated shape, to provide access to the bolt head 26 in all vertically displaced positions of the wheel plate section 23. Similar bolt head access apertures may be provided in the panels of the container handling vehicles 400,500,700 of FIGS. 4-8 and 10.

Though a hexagonal bolt head has been described in this embodiment, other arrangements are possible—e.g., splined fittings, allen key recesses or any coupling arrangement for allowing a tool to be introduced to manually crank the motor responsible for displacing the wheels, as will be apparent to the person skilled in the art based on the disclosure of the invention herein.

Since the container delivery vehicle 600 does not comprise a container receiving space for receival of a storage container 106 from storage columns below a grid, the displacement mechanism 16 of the container delivery vehicle 600 may not require connecting plate sections 41,41' extending from an upper frame part 48 to the wheel plate sections 23, 23'. Instead, the displacement links 22,22' of the container delivery vehicle's 600 displacement mechanism 16 may be directly attached to the wheel plate sections 23,23'.

A first wheel plate section 23 has been taken out of the vehicle 600 in FIG. 9B, exposing a first side of a displacement mechanism 16 extending through a lower frame part 52 of the vehicle body 51. FIG. 9B illustrates the displacement mechanism 16 as comprising drive crank 20, a hexagonal bolt head 26 arranged on a driving shaft, an arcuate shaped coupler link 19, a first side lift rocker 21, a lift shaft 18 and a first side displacement link 22. The second end of the first side displacement link 22 is rotationally attached to the inside of the first side wheel plate section 23, and is substantially shorter relative to those of the displacement mechanisms 16 in FIGS. 4-8 and 10.

The displacement mechanism 16 in FIG. 9B is illustrated without comprising a motor flange and a lift shaft flange, although flanges may also be provided in other configurations. Upper and lower stops 46', 47' may therefore be arranged directly on the lower frame part 52 to restrain movement of the drive crank 20 as in the previous embodiments.

On the second side 36 of the container delivery vehicle 600, the displacement mechanism 16 may comprise a similar configuration as for the second side 36 of the previously disclosed embodiments although configured for a container delivery vehicle 600.

Figure 10:
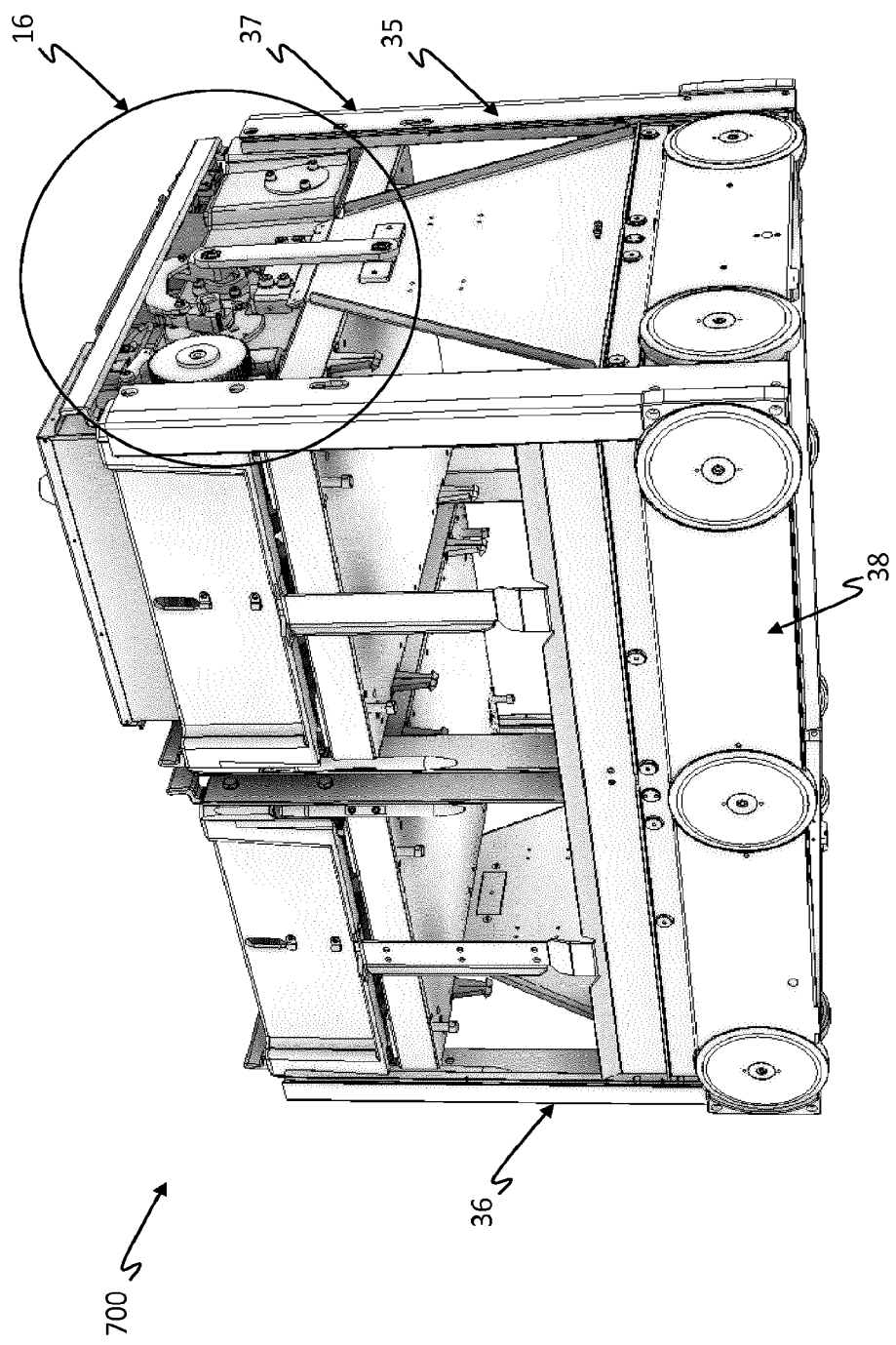
FIG. 10 is perspective view of a fifth container handling vehicle stripped of side walls to expose a displacement mechanism.

FIG. 10 illustrates a fifth container handling vehicle 700 stripped of plates to expose a displacement mechanism 16 on a first side 35 of the vehicle 700. The fifth container handling vehicle 700 illustrated in FIG. 10 may have a footprint substantially equal to the dimension of one grid cell 122 in one direction X,Y and two grid cells 122 in the other direction X,Y.

The fifth container handling vehicle 700 may comprise two container receiving spaces 8, where lifting devices are arranged above each container receiving space 8 to lift and lower storage containers 106.

The set of displaceable wheels are exemplified in FIG. 10 as being arranged on the two opposite sides 35,36 of the container handling vehicle 700 spaced apart by two grid cells 122. Due to the distance between the displacement plates 23, 23', 41, 41' of each opposing side 35,36, the fifth container handling vehicle 700 may comprise a displacement mechanism 16 similar to the first side 35 of the third container handling vehicles 400 in FIG. 4 at each side of the fifth container handling vehicle 700.

The wheel displacement assemblies 16 may preferably be rigidly connected by a common lift shaft 18 or a coupling connecting the lift shafts 18 from each side. In other configurations, the fifth container handling vehicle 700 may comprise a displacement mechanism 16 similar to that of the container handling vehicles 400,500,600 of FIGS. 4-9, with only one motor 17 and a long lift shaft 18. In yet further configurations, the fifth container handling vehicle 700 may comprise two wheel displacement assemblies 16 which are not mechanically connected but whose movements are synchronized by an electronic control unit.

In the preceding description, various aspects of the displacement mechanism and remotely operated vehicles according to the invention have been described with reference to the illustrative embodiments. For purposes of explanation, specific numbers, systems and configurations were set forth in order to provide a thorough understanding of the system and its workings. However, this description is not intended to be construed in a limiting sense. Various modifications and variations of the illustrative embodiment, as well as other embodiments of the displacement mechanism, which are apparent to persons skilled in the art to which the disclosed subject matter pertains, are deemed to lie within the scope of the present invention.

What is claimed is:

1. A displacement mechanism for actuating wheels of a remotely operated vehicle, the displacement mechanism comprising:
 a motor configured to actuate a drive crank;
 a coupler link connected to the drive crank on a first side and a lift rocker on a second side;
 a displacement link connected to the lift rocker; and a displacement plate connected to the displacement link and having a plurality of wheels provided thereon, wherein the drive crank, the coupler link, the lift rocker, the displacement link, and the displacement plate are each respectively connected with pivot connections such that actuation of the motor actuates the displacement plate between a raised position and a lowered position, and wherein the lift rocker is configured with a pivot point arranged in a body of the lift rocker such that the lift rocker, the pivot connection between the displacement link and the lift rocker, and the pivot connection between the lift rocker and the coupler link each rotate around the pivot point when the motor is actuated.

2. The displacement mechanism according to claim 1, wherein the coupler link has an arcuate shape.

3. The displacement mechanism according to claim 2, wherein the drive crank, the lift rocker, and the displacement link form a four-bar linkage.

4. The displacement mechanism according to claim 2, wherein, in the raised position, the coupler link straddles the pivot connection between the displacement link and the lift rocker such that the pivot connection between the coupler link and the drive crank is disposed on an opposite side of the displacement link from the pivot connection between the coupler link and the lift rocker.

5. The displacement mechanism according to claim 2, wherein, in the lowered position, the coupler link straddles a fixed connection between the drive crank and the motor such that the pivot connection between the coupler link and the drive crank is disposed on an opposite side of the fixed connection from the pivot connection between the coupler link and the lift rocker.

6. The displacement mechanism according to claim 1, wherein, in the lowered position, the pivot connection between the displacement link and the lift rocker aligns with a center line of the displacement plate.

7. The displacement mechanism according to claim 1, wherein a distance between the pivot point of the lift rocker and the pivot connection of the displacement link and the lift rocker is shorter than a distance between the pivot point of the lift rocker and the pivot connection of the coupler link and the lift rocker.

8. The displacement mechanism according to claim 1, wherein the drive crank is arranged to move through an angle greater than 180 degrees between the raised position and the lowered position.

9. The displacement mechanism according to claim 1, wherein the drive crank stops against a lower stop when the displacement mechanism is in the lowered position.

10. The displacement mechanism according to claim 1, wherein the drive crank stops against an upper stop when the displacement mechanism is in the raised position.

11. The displacement mechanism according to claim 1, wherein the drive crank is configured with a mechanical interface shaped corresponding to a tool that mechanically actuates the motor.

12. A remotely operated vehicle comprising:
a displacement mechanism comprising:
  a motor configured to actuate a drive crank;
  a coupler link connected to the drive crank on a first side and a lift rocker on a second side;
  a displacement link connected to the lift rocker; and
  a first displacement plate connected to the displacement link and having a first plurality of wheels provided thereon, wherein the drive crank, the coupler link, the lift rocker, the displacement link, and the first displacement plate are each respectively connected with pivot connections such that actuation of the motor actuates the first displacement plate between a raised position and a lowered position, and wherein the lift rocker is configured with a pivot point arranged in a body of the lift rocker such that the lift rocker, the pivot connection between the displacement link and the lift rocker, and the pivot connection between the lift rocker and the coupler link each rotate around the pivot point when the motor is actuated, a lift shaft configured to couple the lift rocker of the displacement mechanism to a second rocker disposed on an opposite side of the remotely operated vehicle, wherein the second rocker is connected to a second displacement plate provided with a second plurality of wheels thereon, and actuation of the lift rocker is transmitted to the second displacement plate via the lift shaft and the second rocker.

13. The remotely operated vehicle of claim 12, wherein the lift rocker is rigidly fixed to the lift shaft such that the lift shaft is rotated by the lift rocker.

14. The remotely operated vehicle of claim 12, wherein the pivot point of the lift rocker is formed at a connection between the lift rocker and the lift shaft.

15. The remotely operated vehicle of claim 12, wherein the first displacement plate is connected to an upper frame of the remotely operated vehicle via a linear bearing such that the first displacement plate is only actuated in a vertical direction.

16. A method for actuating wheels of a remotely operated vehicle, the method comprising:
actuating a drive crank that is connected, by a pivot connection, to a coupler link, thereby displacing the coupler link,
rotating a lift rocker with the displacement of the coupler link,
actuating a displacement link with the rotation of the lift rocker, and
actuating a displacement plate comprising a plurality of wheels with the actuation of the displacement link, thereby actuating the displacement plate between a raised position and a lowered position,
wherein the lift rocker is configured with a pivot point such that rotating the lift rocker causes the lift rocker, the pivot connection between the displacement link and the lift rocker, and the pivot connection between the lift rocker and the coupler link to each rotate around the pivot point when a motor is actuated.

17. The method according to claim 16, further comprising straddling the pivot connection between the displacement link and the lift rocker with the coupler link such that the pivot connection between the coupler link and the drive crank is disposed on an opposite side of the displacement link from the pivot connection between the coupler link and the lift rocker in the raised position.

18. The method according to claim 16, further comprising straddling a fixed connection between the drive crank and the motor such that the pivot connection between the coupler link and the drive crank is disposed on an opposite side of the fixed connection from the pivot connection between the coupler link and the lift rocker in the lowered position.

19. The method according to claim 16, further comprising stopping the drive crank against a lower stop when the displacement plate is in the lowered position and stopping the drive crank against an upper stop when the displacement plate is in the raised position.

20. The method according to claim 16, wherein the displacement plate is only actuated in a vertical direction.

\* \* \* \* \*